United States Patent
Ohsawa et al.

(10) Patent No.: US 6,881,944 B2
(45) Date of Patent: Apr. 19, 2005

(54) SOLID STATE IMAGE SENSOR WITH SIGNAL LINE POTENTIAL ADJUSTMENT CIRCUIT AND METHOD OF DRIVING THE SAME

(75) Inventors: Shinji Ohsawa, Yokohama (JP); Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 10/375,196

(22) Filed: Feb. 28, 2003

(65) Prior Publication Data

US 2003/0179159 A1 Sep. 25, 2003

(30) Foreign Application Priority Data

Mar. 1, 2002 (JP) ........................................ 2002-056390

(51) Int. Cl.[7] ............................................... H01L 27/00
(52) U.S. Cl. .................................... 250/208.1; 348/302
(58) Field of Search .......................... 250/208.1, 214 R; 348/302–304, 307–310

(56) References Cited

U.S. PATENT DOCUMENTS 5,717,458 A  *  2/1998  Yonemoto .................. 348/305
6,002,435 A  *  12/1999  Yamamoto et al. .......... 348/307
6,667,468 B1  *  12/2003  Kurosawa et al. ........ 250/208.1
6,677,997 B1  *  1/2004  Kuroda et al. .............. 348/308

FOREIGN PATENT DOCUMENTS

JP          2000-287131        10/2000

* cited by examiner

Primary Examiner—Stephone B. Allen
Assistant Examiner—Patrick J. Lee
(74) Attorney, Agent, or Firm—Oblon, Spivak, McClelland, Maier & Neustadt, P.C.

(57) ABSTRACT

A solid state image sensor includes an imaging circuit, a selection circuit, a signal line and an adjustment circuit. The imaging circuit has a plurality of unit cells including a photo-detection section and a first reference potential generating section which generates a first reference potential. The selection circuit selects the unit cell. The signal line is supplied with a signal potential corresponding to a signal charge from the unit cell in a read-out operation, and supplied with the first reference potential in a reset operation. The adjustment circuit operates in response to an adjustment instruction signal which is asserted in an adjustment operation following the reset operation, and applies a second reference potential to the signal line in accordance with a potential of the signal line.

18 Claims, 19 Drawing Sheets

FIG. 5

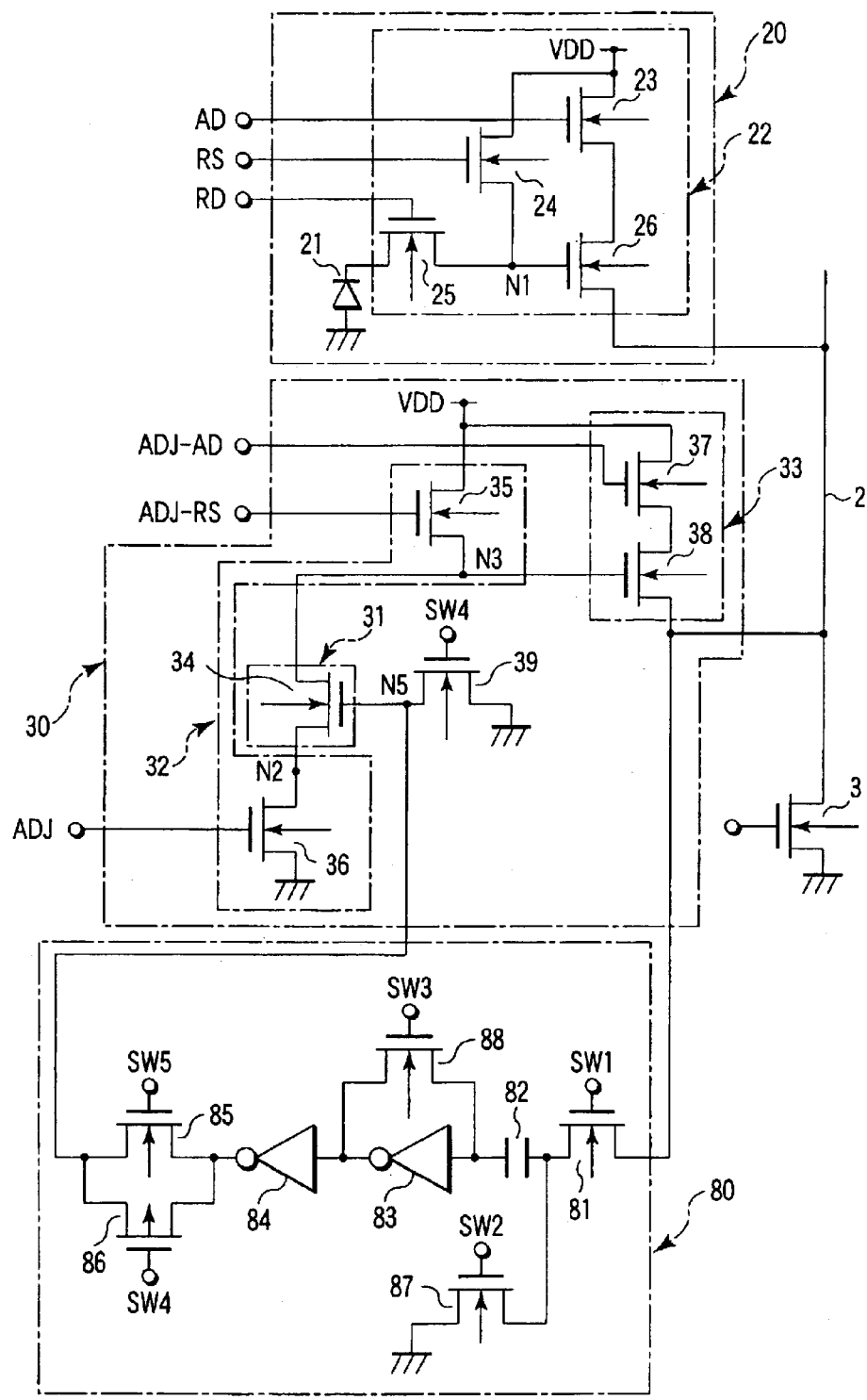
F I G. 12

SOLID STATE IMAGE SENSOR WITH SIGNAL LINE POTENTIAL ADJUSTMENT CIRCUIT AND METHOD OF DRIVING THE SAME

CROSS-REFERENCE TO RELATED APPLICATIONS

This application is based upon and claims the benefit of priority from the prior Japanese Patent Application No. 2002-056390, filed Mar. 1, 2002, the entire contents of which are incorporated herein by reference.

BACKGROUND OF THE INVENTION

1. Field of the Invention

The present invention relates to a solid state image sensor with a signal line potential adjustment circuit, and a method of driving the same. In particular, this invention relates to a technique of suppressing a decrease in magnitude of a signal in a unit cell when intense light has been incident on the solid state image sensor.

2. Description of the Related Art

There is known a conventional solid state image sensor having an amplifier in an image sense region. In this solid state image sensor, there occurs such an undesirable phenomenon that the magnitude of a signal from a unit cell has decreased when intense light has struck on the image sensor. With the phenomenon occurring, an image darkens as if no light were incident.

The phenomenon occurs because a signal line potential lowers at the time of a reset operation that is executed prior to the read-out of a signal from the unit cell. At the time of the reset operation, the signal line connected to each unit cell is fixed at a predetermined reference potential. The signal read out of the unit cell is detected on the signal line as a potential difference from the reference potential. However, if intense light has struck on the solid state image sensor, photoelectric conversion takes place in parts other than a photodiode that reads an image. The photoelectric conversion produces excess electrons, resulting in a decrease of the signal line potential from the reference potential. Consequently, the magnitude of the read-out signal from the unit cell decreases as the incident light increases, and the image becomes darker.

A means for solving this problem is disclosed in Jpn. Pat. Appln. KOKAI Publication No. 2000-287131, for instance. In the technique in this publication, a voltage generator for generating a reference voltage is provided. In addition, a comparator is used to monitor whether the signal line potential at the time of reset is within a predetermined range. If the signal line potential has decreased below a predetermined range, a pulse synthesizer generates a signal-pulse. When the signal-pulse has been generated, the reference voltage supplied from the voltage generator is applied to the signal line through a selector. Thus, the signal line potential at the time of reset can be fixed at the reference potential, and even when intense light has been incident, a normal image can be captured.

In the technique of the above-mentioned publication, however, the number of structural elements to be newly added to the solid state image sensor, such as the pulse synthesizer, voltage generator, etc., tends to increase. As a result, the size of the solid state image sensor, as well as the manufacturing cost thereof, tends to increase.

BRIEF SUMMARY OF THE INVENTION

A solid state image sensor according to a first aspect of the present invention comprises:

an imaging circuit having a plurality of unit cells arranged in an array, each unit cell including a photo-detection section which photoelectrically converts incident light and outputs a signal charge corresponding to the incident light, and a first reference potential generating section which generates a first reference potential;

a selection circuit which selects the unit cell;

a signal line which is supplied with a signal potential corresponding to the signal charge from the unit cell selected by the selection circuit in a read-out operation, and supplied with the first reference potential in a reset operation; and an adjustment circuit which operates in response to an adjustment instruction signal which is asserted in an adjustment operation following the reset operation, and applies a second reference potential to the signal line in accordance with a potential of the signal line, the adjusting circuit including:

a detection section which connects a first node and a ground potential node when the potential of the signal line is higher than a predetermined value, and disconnects the first node and the ground potential node when the potential of the signal line is lower than the predetermined value;

a voltage substitute section which connects the first node and a second node supplied with a control potential in the reset operation, during a time period when the adjustment instruction signal is asserted, and disconnects the first node and the second node during a time period when the adjustment instruction signal is negated; and a second reference potential generating circuit which operates in response to a potential of the second node, is set in an inoperative state when the potential of the second node is equal to the ground potential, and is set in an operative state and applies the second reference potential to the signal line when the potential of the second node is equal to the control potential.

BRIEF DESCRIPTION OF THE DRAWINGS

FIG. 5 is a circuit diagram of a part of a solid state image sensor according to a second embodiment of the invention;

FIG. 12 is a circuit diagram of a part of a solid state image sensor according to a fourth embodiment of the invention;

DETAILED DESCRIPTION OF THE INVENTION

Figure 1:
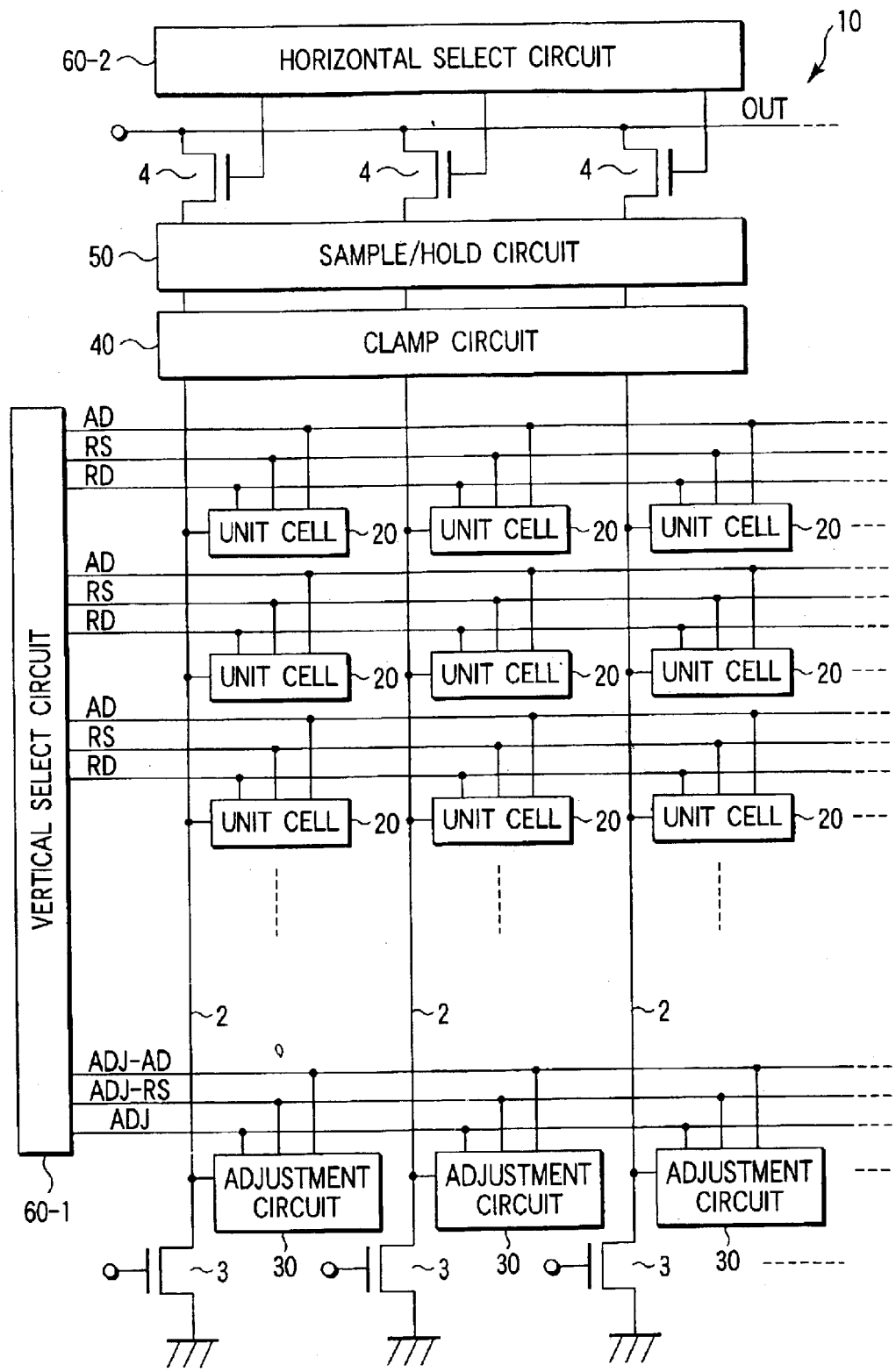
FIG. 1 is a block diagram that schematically shows the structure of a solid state image sensor according to a first embodiment of the present invention.

A solid state image sensor according to a first embodiment of the present invention will now be described with reference to FIG. 1. FIG. 1 is a block diagram showing a schematic structure of a MOS type solid state image sensor.

As is shown in FIG. 1, a solid state image sensor 10 comprises unit cells 20, adjustment circuits 30, a clamp circuit 40, a sample/hold circuit 50, a vertical select circuit 60-1, and a horizontal select circuit 60-2.

FIG. 1 shows, by way of example, only 3×3 unit cells. The number of the unit cells is not limited. The unit cells 20 are arranged in a matrix and form an image area. The unit cells 20 are commonly connected to associated vertical signal lines 2 in columns. The unit cells 20 in the same row are controlled by an address signal AD, a reset signal RS and a read-out signal RD which are delivered by the vertical select circuit 60-1.

Each adjustment circuit 30 is connected to an associated one of the vertical signal lines 2. The adjustment circuits 30 are controlled by an adjustment address signal ADJ-AD, an adjustment reset signal ADJ-RS and an adjustment instruction signal ADJ.

The clamp circuit 40 is connected to one end of each vertical signal line 2 and clamps signals read out to the vertical signal lines 2. The other end of each vertical signal line 2 is connected to a ground potential via a load transistor 3.

The sample/hold circuit 50 samples and holds the signals clamped by the clamp circuit 40. The signals held by the sample/hold circuit 50 are output to an output node OUT via read-out transistors 4. The gate of each read-out transistor 4 is controlled by the horizontal select circuit 60-2.

Figure 2A:
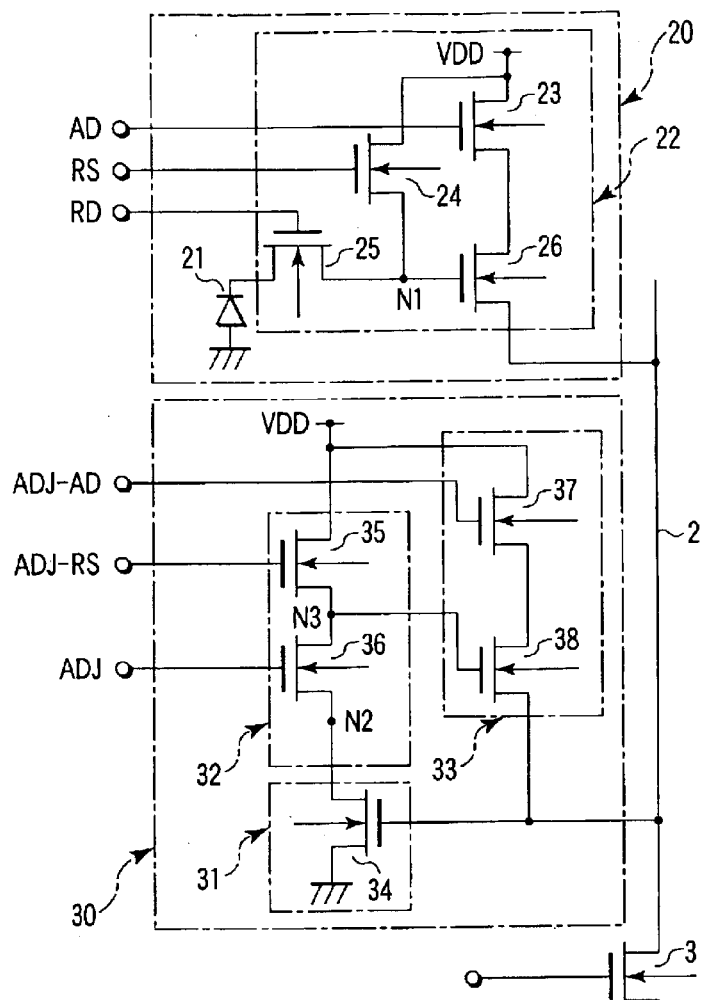
FIG. 2A is a circuit diagram showing a unit cell and a adjustment circuit included in the solid state image sensor according to the first embodiment of the invention.
Figure 2B:
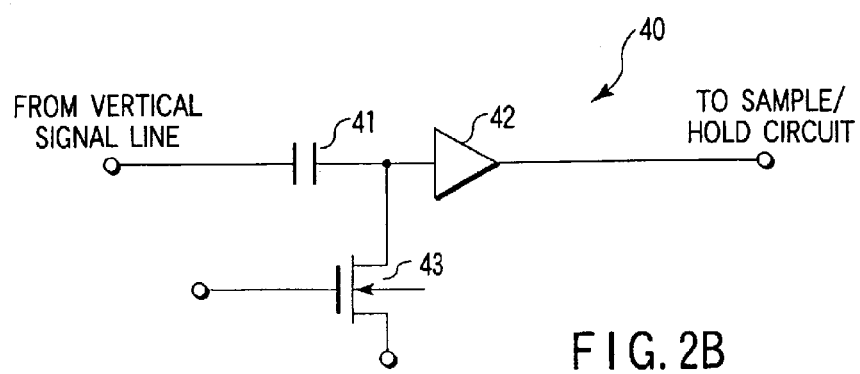
FIG. 2B is a circuit diagram showing a clamp circuit included in the solid state image sensor according to the first embodiment of the invention.

FIG. 2A and FIG. 2B are circuit diagrams showing specific structures of parts of the solid state image sensor.

FIG. 2A shows the unit cell and adjustment circuit. FIG. 2B shows the clamp circuit.

As is shown in FIG. 2A, the unit cell 20 includes a photodiode 21 and a voltage output section 22. The photodiode 21 generates a charge in accordance with incident light. The voltage output section 22 includes an address transistor 23, a reset transistor 24, a read-out transistor 25 and an output transistor 26. The address transistor 23 has a gate supplied with an address signal AD, a drain connected to a power supply potential VDD, and a source. The reset transistor 24 has a gate supplied with a reset signal RS, a drain connected to a power supply potential VDD, and a source. The read-out transistor 25 has a gate supplied with a read-out signal RD, a drain connected to a cathode of the photodiode 21, and a source commonly connected to the source of the reset transistor 24. The output transistor 26 has a gate connected to a common connection node N1 between the source of the reset transistor 24 and the source of the read-out transistor 25, a drain connected to the source of the address transistor 23, and a source connected to the vertical signal line 2.

The adjustment circuit 30 includes a detection section 31, a voltage substitute section 32 and a voltage output section 33. The detection section 31 includes a determination transistor 34. The determination transistor 34 has a gate connected to the vertical signal line 2, a source connected to a ground potential, and a drain. The voltage substitute section 32 includes an adjustment reset transistor 35 and an adjustment detection transistor 36. The adjustment reset transistor 35 has a gate supplied with the adjustment reset signal ADJ-RS, a drain connected to a power supply potential VDD, and a source. The adjustment detection transistor 36 has a gate supplied with the adjustment instruction signal ADJ, a drain connected to the source of the adjustment reset transistor 35, and a source connected to the drain of the determination transistor 34. A connection node between the source of adjustment detection transistor and the drain of determination transistor 34 is referred to as a node N2. A connection node between the source of adjustment reset transistor 35 and the drain of adjustment detection transistor 36 is referred to as a node N3. The voltage output section 33 includes an adjustment address transistor 37 and an adjustment output transistor 38. The adjustment address transistor 37 has a gate supplied with the adjustment address signal ADJ-AD, a drain connected to the power supply potential VDD, and a source. The adjustment output transistor 38 has a gate connected to the node N3, a drain connected to the source of the adjustment address transistor 37, and a source connected to the vertical signal line 2.

As is shown in FIG. 2B, the clamp circuit 40 includes a capacitor 41, an output buffer 42 and a clamp transistor 43. The capacitor 41 has one electrode connected to the vertical signal line 2, and the other electrode connected to an input node of the output buffer 42. The clamp transistor 43 has a gate, a drain connected to a predetermined output bias potential, and a source connected to the input node of the output buffer 42. An output node of the output buffer 42 functions as an output node of the clamp circuit 40.

Figure 3:
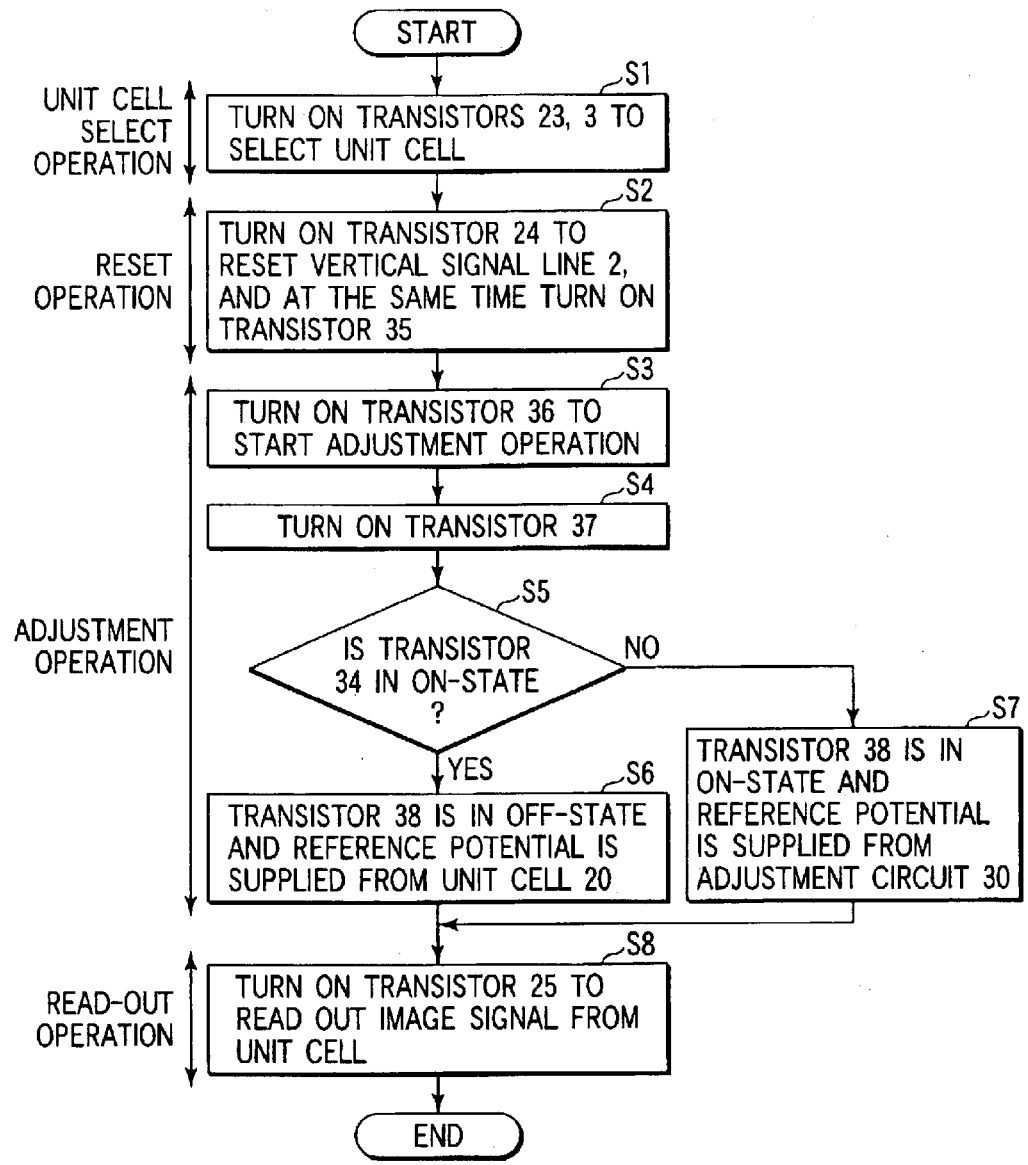
FIG. 3 is a flow chart illustrating the operation of the solid state image sensor according to the first embodiment of the invention.

The operation of the solid state image sensor with the above structure will now be described with reference to FIGS. 3 and 4. FIG. 3 is a flow chart illustrating the operation of the solid state image sensor, and FIG. 4 is a timing chart showing potential variations of various signals and nodes.

Figure 4:
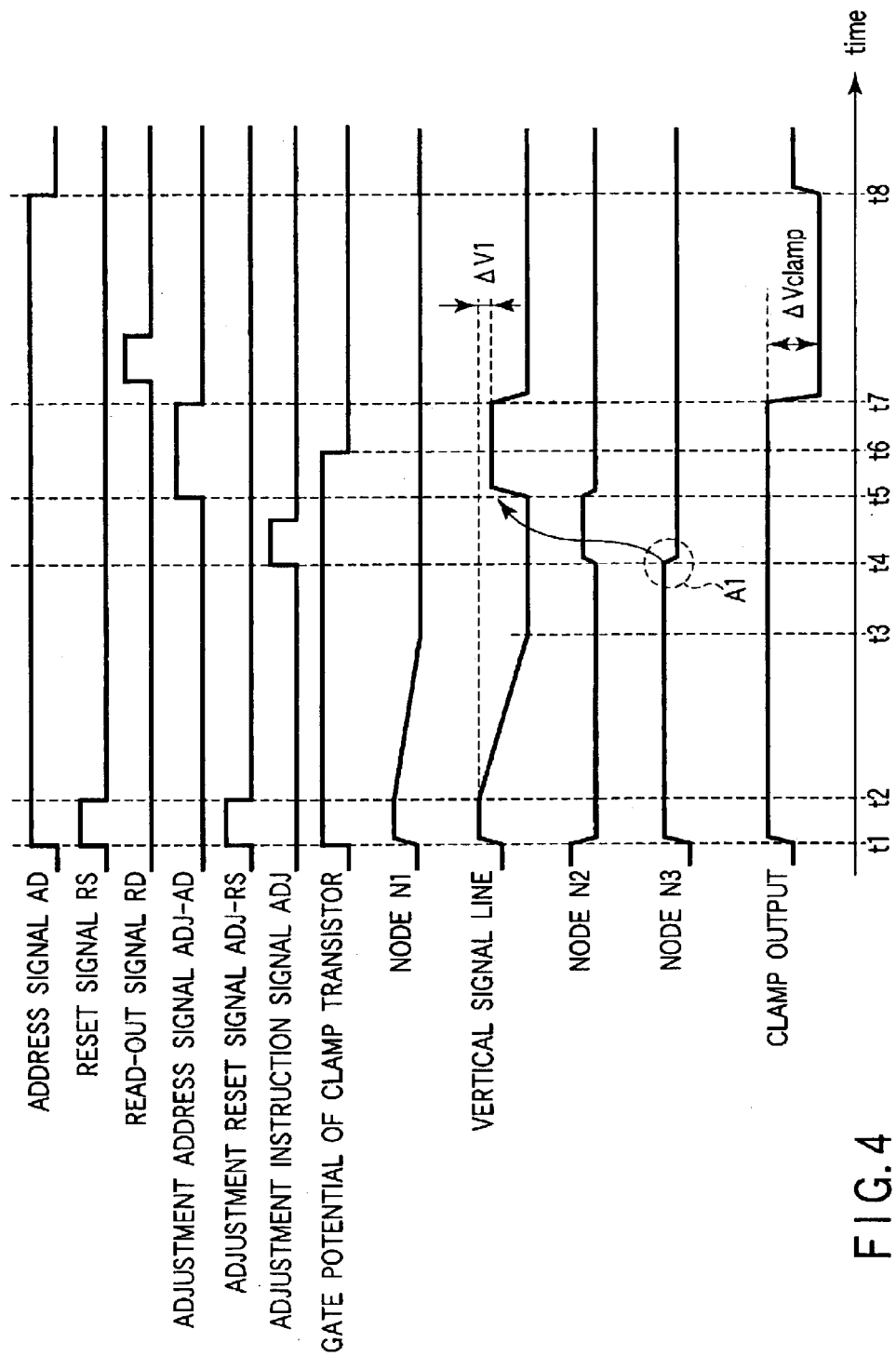
FIG. 4 is a timing chart of various signals at the time when the solid state image sensor according to the first embodiment of the invention is operated.

In step S1, a unit cell is selected (time t1 in FIG. 4). In the select operation, the address transistor 23 of a given unit cell 20 has been turned on by the address signal AD, and the load transistor 3 connected to a given vertical signal line 2 has been turned on.

In step S2, a reset operation is performed to set the vertical signal line 2 at a predetermined reference potential (time t1 in FIG. 4). In the reset operation, when the reset signal RS is asserted to turn on the reset transistor 24 in the selected unit cell. As is shown in FIG. 2A, when the reset transistor 24 has been turned on, the potential of the node N1 is substantially set at the power supply potential VDD. Accordingly, the output transistor 26 is turned on. Then, since the address transistor 23 is in the on-state, the vertical signal line 2 is set at a predetermined reference potential (<VDD) through a path extending from the power supply potential VDD to the vertical signal line 2 via the transistors 23 and 26. In the reset operation, the adjustment reset signal ADJ-RS is also asserted to turn on the adjustment reset transistor 35 in the adjustment circuit 30.

In step S3, an adjustment operation for the potential of the vertical signal line 2 is performed (time t4 in FIG. 4). Specifically, the adjustment instruction signal ADJ is asserted to turn on the adjustment detection transistor 36.

In step S4, the adjustment address signal ADJ-AD is asserted to turn on the adjustment address transistor 37 (time t5 in FIG. 4).

If the intensity of incident light is within a predetermined range, the vertical signal line 2 remains in the fixed state at the reference potential provided by the reset operation. Accordingly, the determination transistor 34 is in the on-state (step S5). When the determination transistor 34 is in the on-state, the node N2 is substantially at the ground potential. Thus, the node N3 is also substantially set at the ground potential via the adjustment detection transistor 36, and the adjustment output transistor 38 is set in the off-state. Hence, the adjustment circuit 30 generates no reference potential. In short, the reference potential from the unit cell 20 is supplied to the vertical signal line 2 (step S6).

On the other hand, when very intense light has fallen on the solid state image sensor 10, the potential of the vertical signal line 2 decreases. In this case, such very intense light may strike on parts other than the photodiode 21. For example, the light may strike on the source regions of the transistors 24 and 25 of the unit cell 20. Then, photoelectric conversion takes place in these regions, and a charge occurs. The charge lowers the potential of node N1. Specifically, the supply voltage of the output transistor 26 gradually lowers and the potential of the vertical signal line 2 decreases, as shown in FIG. 4, in a time period t2–t3. If the potential of the node N1 becomes lower than the threshold of the output transistor 26, the output transistor 26 is turned off (t3 in FIG. 4). In addition, with the decrease in potential of the vertical signal line 2, the determination transistor 34 in the adjustment circuit 30 is turned off (Step S5; t3 in FIG. 4). Then, even if the adjustment detection transistor 36 is turned on, the determination transistor 34 is in the off-state and the potential of node N3 is substantially at the power supply potential VDD. Accordingly, the adjustment output transistor 38 is in the on-state. As a result, the vertical signal line 2 is re-supplied with the predetermined reference potential through a path extending from the power supply potential VDD to the vertical signal line 2 via the transistors 37 and 38 in the adjustment circuit 30 (step S7; time t5 in FIG. 4).

After the potential of the vertical signal line 2 has been set at the reference potential, an image signal is read out from the unit cell 20 to the vertical signal line 2 in step S8. To be more specific, the read-out signal RD is asserted to turn on the read-out transistor 25 in the selected unit cell 20. Then, a signal charge accumulated in the photodiode 21 is read out to the node N1. Then, the output transistor 26 delivers to the vertical signal line 2 a voltage, i.e. an image signal, which corresponds to the amount of the signal charge read out to the node N1. The read-out image signal is read out to the output node OUT via the clamp circuit 40, sample/hold circuit 50 and read-out transistor 4.

The clamp circuit 40 outputs a signal fixed at a predetermined level until the image signal is read out of the unit cell 20, since the clamp transistor is set in the on-state in a time period of t1–t6. If the read-out signal RD is asserted, a potential variation in the vertical signal line 2 due to the read-out of the image signal is taken in the clamp circuit. In the clamp circuit 40, the image signal is taken out as a variation ΔVclamp relative to the source potential of the clamp transistor 43. The timing chart of FIG. 4 exemplifies the case where the output transistor 26 is turned off due to the incidence of very intense light on the solid state image sensor 10. Accordingly, the moment the adjustment address transistor 37 has been turned off, the potential of the vertical signal line 2 lowers, and even after the read-out transistor 25 is turned on, the potential of the vertical signal line 2 remains unchanged.

The above-described solid state image sensor is provided with the adjustment circuit 30 which generates the reference potential. If the potential of the vertical signal line 2 has lowered in the reset operation, the adjustment circuit 30 in lieu of the unit cell 20 supplies the reference potential to the vertical signal line 2. It is thus possible to sufficiently obtain a potential variation in the vertical signal line 2, which is caused by the read-out of the image signal from the unit cell 20. As a result, even when very intense light has struck on the solid state image sensor, a decrease in magnitude of the image signal can be suppressed and an exact image can be taken in.

The adjustment circuit 30 includes the detection section 31, voltage substitute section 32 and voltage output section 33. The detection section 31 detects a potential decrease in the vertical signal line 2. Responding to the detection result, the voltage output section 33 is rendered operative. The voltage output section 33 operates to supply the reference voltage to the vertical signal line 2. On the other hand, if the detection section 31 detects no decrease in potential of the vertical signal line 2, the voltage output section 33 is rendered inoperative and the unit cell 20 supplies the reference voltage to the vertical signal line 2. The detection section 31 comprises the MOS transistor 34 having the source connected to the ground potential, and the drain connected to the voltage output section 33 via the adjustment detection transistor 36. Simply by turning on the adjustment detection transistor 36 at the time of starting the adjustment operation, the operation/non-operation of the voltage output section 33 is automatically determined depending on the potential of the vertical signal line 2. Thus, unlike the prior art (see Jpn. Pat. Appln. KOKAI Publication No. 2000-287131), when the reference potential is supplied to the vertical signal line 2, there is no need to provide a selector for determining whether the reference potential is supplied from the unit cell 20 or from the adjustment circuit 30. Therefore, the pulse generator for controlling the selector is needless, and the structure of the solid state image sensor can be simplified.

Figure 5:
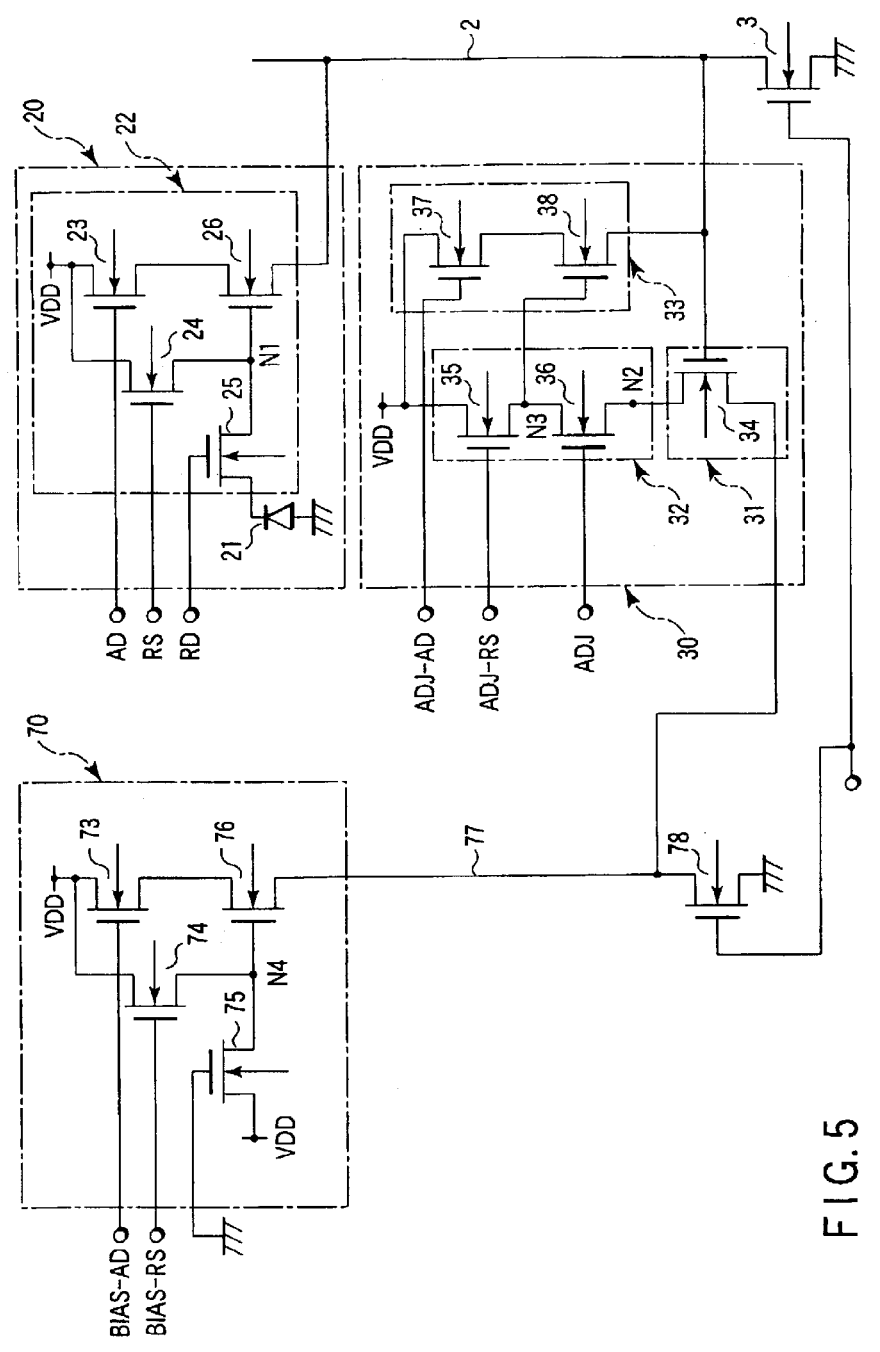

A solid state image sensor according to a second embodiment of the present invention will now be described with reference to FIG. 5. In the second embodiment, a bias circuit 70 and a bias load transistor 78 are added to the structure of the first embodiment. FIG. 5 is a circuit diagram of the unit cell, adjustment circuit and bias circuit in the solid state image sensor. The structure of the unit cell 20 and the structures of the voltage substitute section 32 and voltage output section 33 in the adjustment circuit 30 are the same as those in the first embodiment. Thus, a description of these structures is omitted.

The bias circuit 70 has substantially the same structure as the voltage output section 22 in the unit cell 20. The bias circuit 70 comprises an address transistor 73, a reset transistor 74, a read-out transistor 75 and an output transistor 76. The address transistor 73 has a gate supplied with a bias address signal BIAS-AD, a drain connected to a power supply potential VDD, and a source. The reset transistor 74 has a gate supplied with a bias reset signal BIAS-RS, a drain connected to a power supply potential VDD, and a source. The read-out transistor 75 has a gate connected to a ground potential, a drain connected to the power supply potential VDD, and a source commonly connected to the source of the reset transistor 74. The output transistor 76 has a gate connected to a common connection node N4 of the source of the reset transistor 74 and the source of the read-out transistor 75, a drain connected to the source of the address transistor 73, and a source connected to one end of a bias voltage output wiring 77. The other end of the bias voltage output wiring 77 is connected to a ground potential via the bias load transistor 78. The gate of the bias load transistor 78 is commonly connected to the gate of the load transistor 3 and is supplied with the same signal. The bias address signal BIAS-AD and bias reset signal BIAS-RS may be the same as the address signal AD and reset signal RS input to the unit cell 20.

The bias voltage output wiring 77 is connected to the source of the determination transistor 34 in the adjustment circuit 30.

Figure 6:
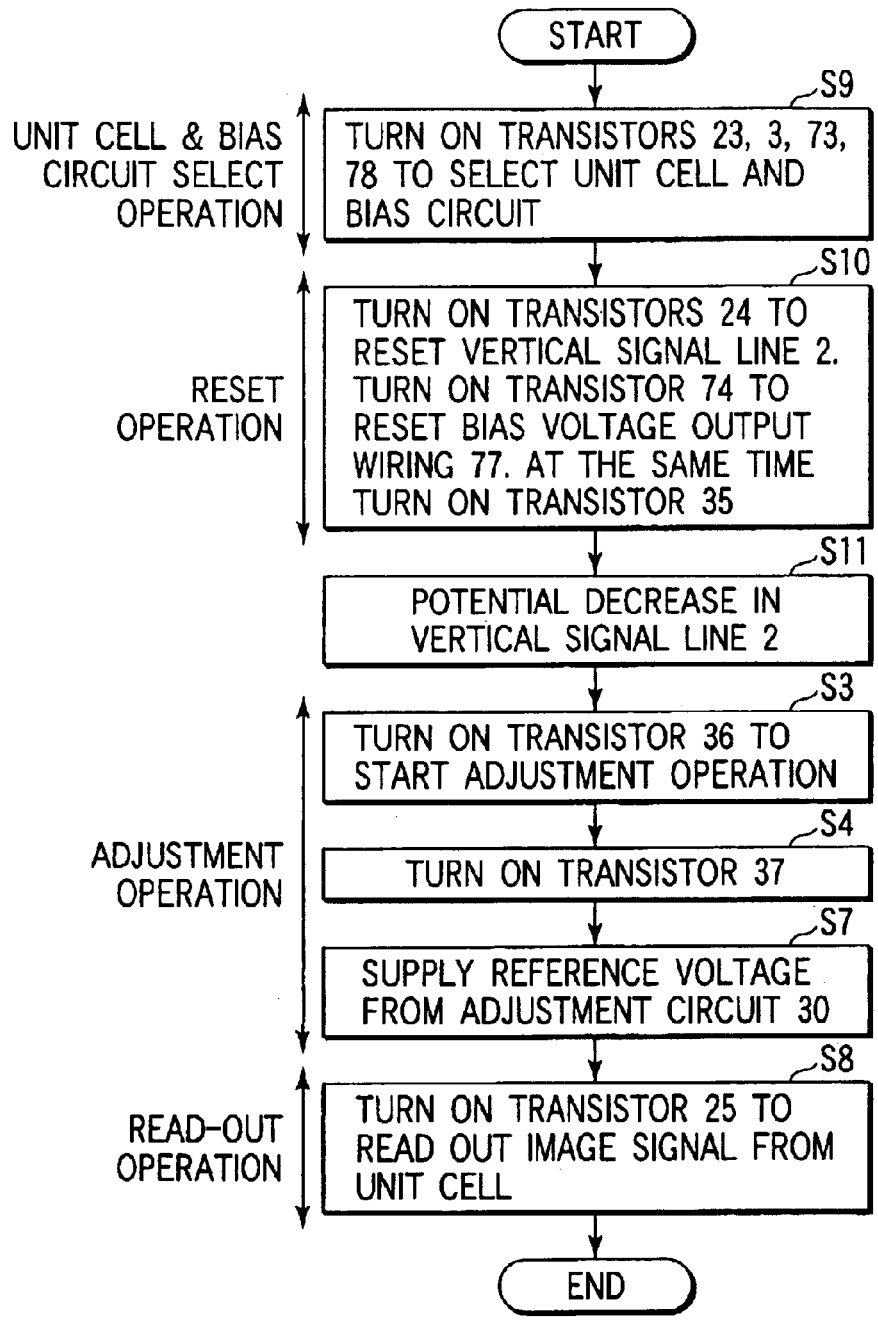
FIG. 6 is a flow chart illustrating the operation of the solid state image sensor according to the second embodiment of the invention.
Figure 7:
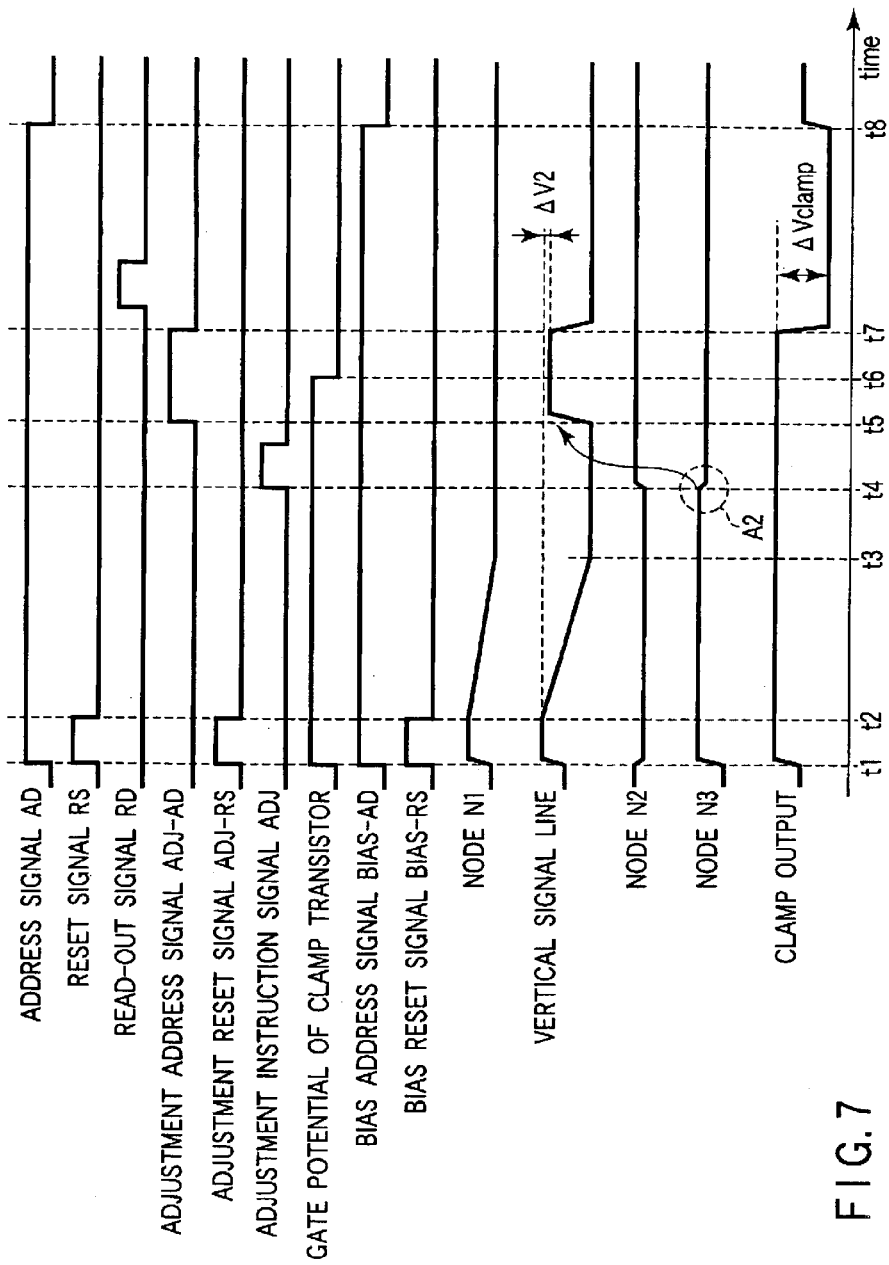
FIG. 7 is a timing chart of various signals at the time when the solid state image sensor according to the second embodiment of the invention is operated.

The operation of the solid state image sensor with the above structure will now be described with reference to FIGS. 6 and 7. FIG. 6 is a flow chart illustrating the operation of the solid state image sensor, and FIG. 7 is a timing chart showing potential variations of various signals and nodes. Assume that very intense light has been incident on the solid state image sensor.

In step S9, the unit cell 20 and bias circuit 70 are selected (time t1 in FIG. 7). Specifically, the address signal AD is asserted to turn on the address transistor 23, and the load transistor 3 is turned on, thereby selecting the unit cell 20. In addition, the bias address signal BIAS-AD is asserted to turn on the address transistor 73, and the bias load transistor 78 is turned on, thereby selecting the bias circuit 70. As mentioned above, the address signal AD for selecting the unit cell 20 and the bias address signal BIAS-AD for selecting the bias circuit 70 may be the same.

In step S10, like the first embodiment, a reset operation for the vertical signal line 2 is performed (t1 in FIG. 7). In addition, the bias voltage output wiring 77 is reset. The reset operation for the bias voltage output wiring 77 is effected by asserting the bias reset signal BIAS-RS to turn on the reset transistor 74 in the selected bias circuit 70. As is shown in FIG. 5, when the reset transistor 74 is turned on, the potential of node N4 is substantially set at power supply potential VDD. Consequently, the output transistor 76 is turned on. Then, the wiring 77 is set at a predetermined reference potential (<VDD) through a path extending from the power supply potential VDD to the wiring 77 via the transistors 73 and 76. As mentioned above, the reset signals RS and BIAS-RS may be common. In the reset operation, the adjustment reset signal ADJ-RS is also asserted to turn on the adjustment reset transistor 35 in the adjustment circuit 30. The reference voltage appearing on the vertical signal line 2 and that on the wiring 77 can be made equal by commonly using the address signal and reset signal delivered to the voltage output circuit 22 of unit cell 20 and the bias circuit 70, and using the transistors with the same size.

Assume that the potential of the vertical signal line 2 has decreased, as shown in FIG. 7, in a time period t2–t3 (step S11). If the potential of the node N1 becomes lower than the threshold of the output transistor 26, the output transistor 26 is turned off (time t3 in FIG. 7). At the same time, the potential of the vertical signal line 2 decreases, and the determination transistor 34 in the adjustment circuit 30 is turned off.

In the subsequent step S3, the potential adjustment operation for the vertical signal line 2 is performed. The operations that will follow, including the adjustment operation, are the same as those in the first embodiment, and a description thereof is omitted.

According to the above-described solid state image sensor, like the first embodiment, the structure thereof can be simplified. Moreover, compared to the first embodiment, the solid state image sensor of this embodiment can normally operate even when more intense light has been incident. This point will be explained in comparison with the first embodiment.

In the solid state image sensor of the first embodiment as shown in FIGS. 2A and 2B, the source of the determination transistor 34 is connected to the ground potential. Thus, when the potential of the vertical signal line 2 is at high level, the determination transistor 34 is in the on-state. At this time point, the potential of node N2 is the ground potential. Thereafter, if the potential of the vertical signal line 2 decreases and the determination transistor 34 is turned off, and when the adjustment instruction signal ADJ is asserted to turn on the adjustment detection transistor 35, the potential of node N3 slightly lowers (see region A1 in FIG. 4). Consequently, the voltage output from the voltage output section 33 of adjustment circuit 30 becomes slightly lower than the reference voltage. Hence, as shown in FIG. 4, the potential of the vertical signal line 2 is lower than the reference potential by ΔV1.

According to the solid state image sensor of the second embodiment as shown in FIG. 5, however, the source of the determination transistor 34 is connected to the bias voltage output wiring 77. The potential of the wiring 77 is the reference voltage supplied from the unit cell 20. Accordingly, the potential of node N2 at the time the determination transistor 34 is in the on-state is substantially equal to the reference voltage. Thus, compared to the first embodiment, the decrease in voltage of node N3, which occurs when the adjustment detection transistor 35 is turned on after the determination transistor 34 is turned off, can be lessened (see region A2 in FIG. 7). As a result, the voltage output from the voltage output section 33 of adjustment circuit 30 is made closer to the reference voltage (ΔV2<ΔV1). Therefore, at the time of read-out, a sufficient difference from the image signal can be obtained, and the decrease in the image signal can be suppressed more effectively.

In the adjustment operation in which the adjustment instruction signal ADJ is asserted, it is necessary that the output transistor 38 be in the off-state when the adjustment detection transistor 34 is in the on-state. It is thus necessary to design the output transistor 38 so that the output transistor 38 may be set in the off-state with respect to the voltage output from the bias circuit 70 to the bias voltage output wiring 77.

Figure 8:
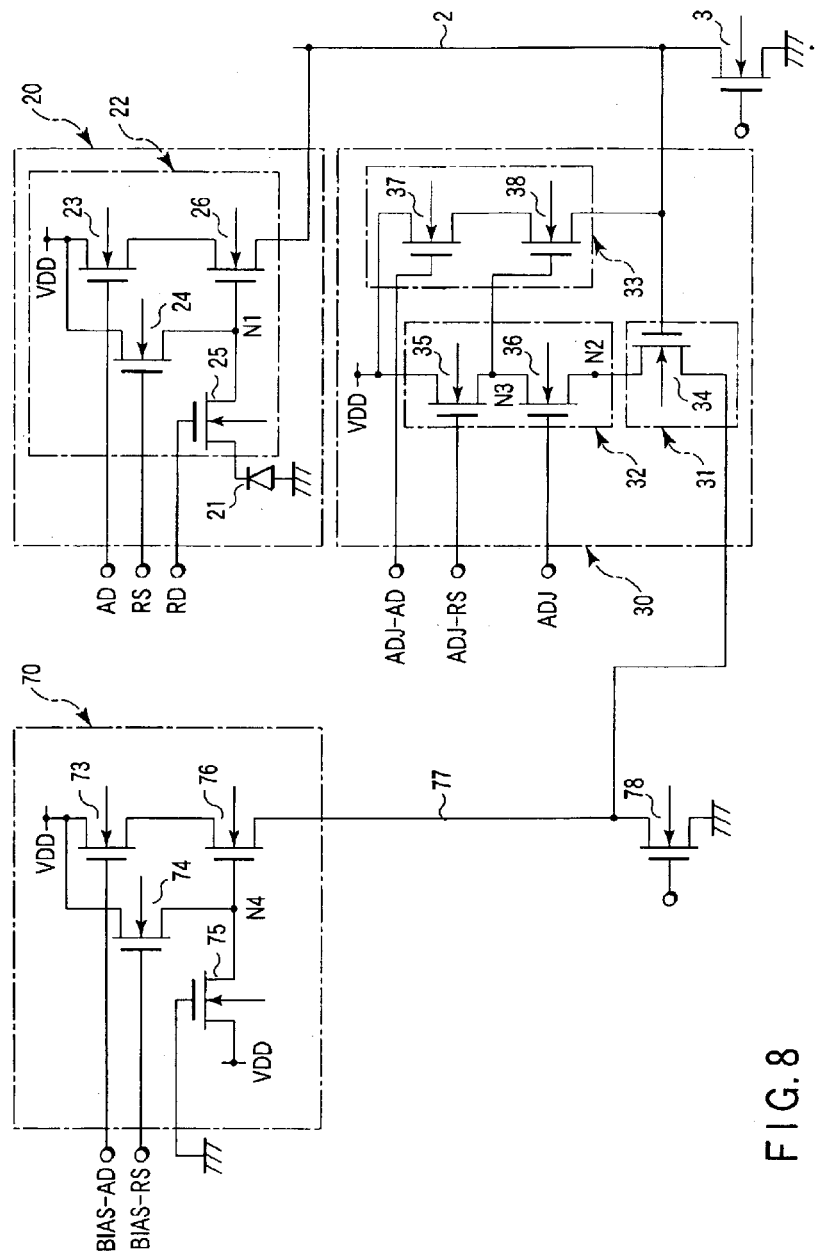
FIG. 8 is a circuit diagram of a part of a solid state image sensor according to a modification of the second embodiment of the invention.

FIG. 8 is a circuit diagram of a unit cell, an adjustment circuit and a bias circuit of a solid state image sensor according to a modification of the second embodiment of the invention. In this modification, the load transistor 3 and the bias load transistor 78 are independently controlled. By controlling the gate voltage of the bias load transistor 78, the voltage applied to the bias voltage output wiring 77 can be controlled. Thereby, the voltage of node N3 in the adjustment circuit 30 can be freely controlled, and the potential decrease in the vertical signal line 2 can be adjusted more effectively. In the meantime, the potential decrease in the vertical signal line 2 can effectively be adjusted by setting the source potential of determination transistor 34 at a level higher than the ground potential. Therefore, an alternative method is to properly change the power supply potential of the bias circuit 70 or the size of the transistors of the bias circuit 70.

Figure 9:
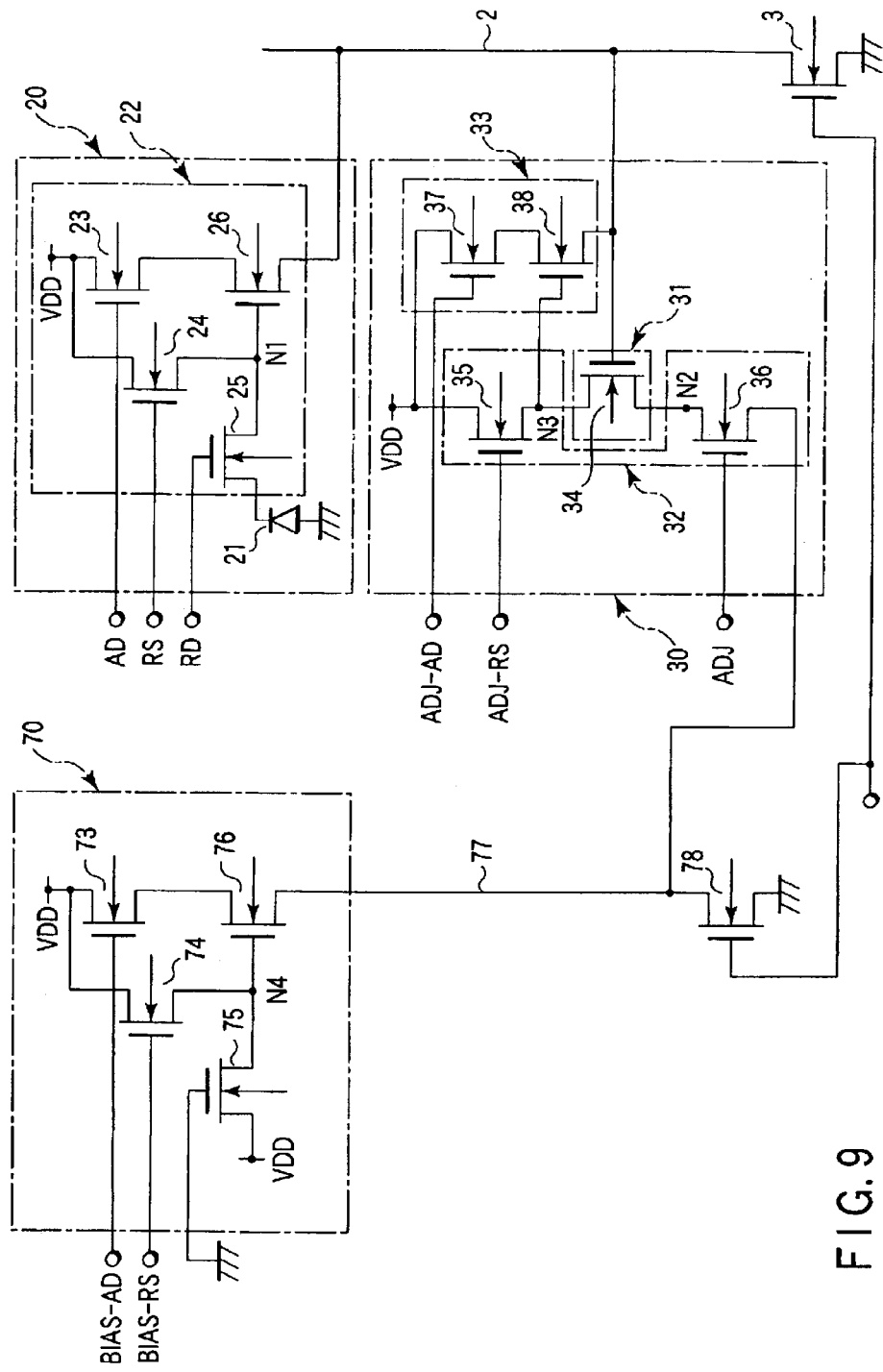
FIG. 9 is a circuit diagram of a part of a solid state image sensor according to a third embodiment of the invention.

A solid state image sensor according to a third embodiment of the invention will now be described with reference to FIG. 9. FIG. 9 is a circuit diagram of a unit cell, an adjustment circuit and a bias circuit in the solid state image sensor.

As is shown in FIG. 9, the solid state image sensor according to the third embodiment differs from that of the second embodiment with respect to the adjustment circuit 30 wherein the drain of the determination transistor 34 is connected to the source of the adjustment reset transistor 35, the drain of the adjustment detection transistor 36 is connected to the source of the determination transistor 34, and the source of the adjustment detection transistor 36 is connected to the bias voltage output wiring 77. The connection node N3 between the drain of the determination transistor 34 and the source of the adjustment reset transistor 35 is connected to the gate of the adjustment output transistor 38.

The operation of the solid state image sensor according to the third embodiment is the same as that of the second embodiment, so a description thereof is omitted.

Figure 10:
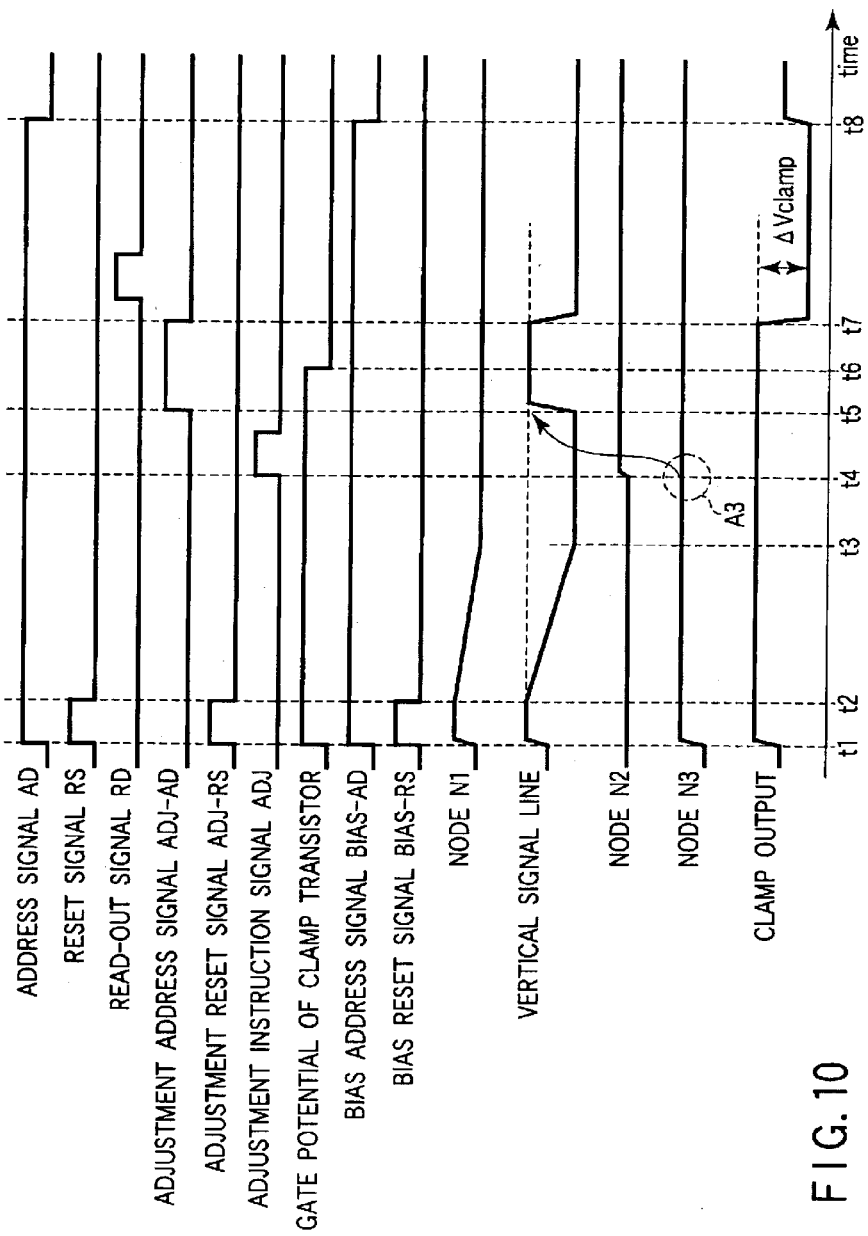
FIG. 10 is a timing chart of various signals at the time when the solid state image sensor according to the third embodiment of the invention is operated.

According to the solid state image sensor with the above-described structure, like the first embodiment, the structure of the solid state image sensor can be made simpler than in the prior art. In addition, in this solid state image sensor, the adjustment detection sensor 36 is provided on the side of the bias voltage output wiring 77, and therefore the optical sensitivity can be made higher than in the second embodiment. This point will now be explained referring to FIGS. 9 and 10. FIG. 10 is a timing chart showing potential variations of various signals and nodes.

Like the first and second embodiments, the unit cell 20 sets the vertical signal line 2 at the reference potential, thereby effecting the reset operation (time t1–t2 in FIG. 10). At this time, since the potential of the vertical signal line 2 is the reference potential, the determination transistor 34 is in the on-state. However, since the adjustment instruction signal ADJ is negated, the adjustment detection transistor 36 is in the off-state. Accordingly, the potential of node N3 does not depend on the wiring 77, and it is substantially equal to the power supply potential VDD supplied via the adjustment reset transistor 35. Then, the adjustment instruction signal ADJ is asserted to start the adjustment operation. At this time point, the determination transistor 34 is in the off-state due to the potential decrease in the vertical signal line 2. Accordingly, the potential of node N3 does not depend on the wiring 77, and it is substantially the power supply potential VDD (region A3 in FIG. 10). As a result, the potential that is supplied by the voltage output section 33 when the adjustment address signal ADJ-RS is asserted is exactly the reference potential.

According to the solid state image sensor of this embodiment, the voltage decrease of node N3 in the adjustment operation can be suppressed and thus the adjustment circuit 30 can set the vertical signal line 2 exactly at the reference potential. Therefore, at the time of read-out, a sufficient difference from the image signal can be obtained, and the decrease in magnitude of the image signal can be suppressed when intense light has been incident.

Moreover, the determination transistor 34 is provided between the node N3 and the adjustment detection transistor 36 connected to the bias voltage output wiring 77. Thus, the node N3 is less affected by the wiring 77, and the potential of node N3 can be stabilized.

Figure 11:
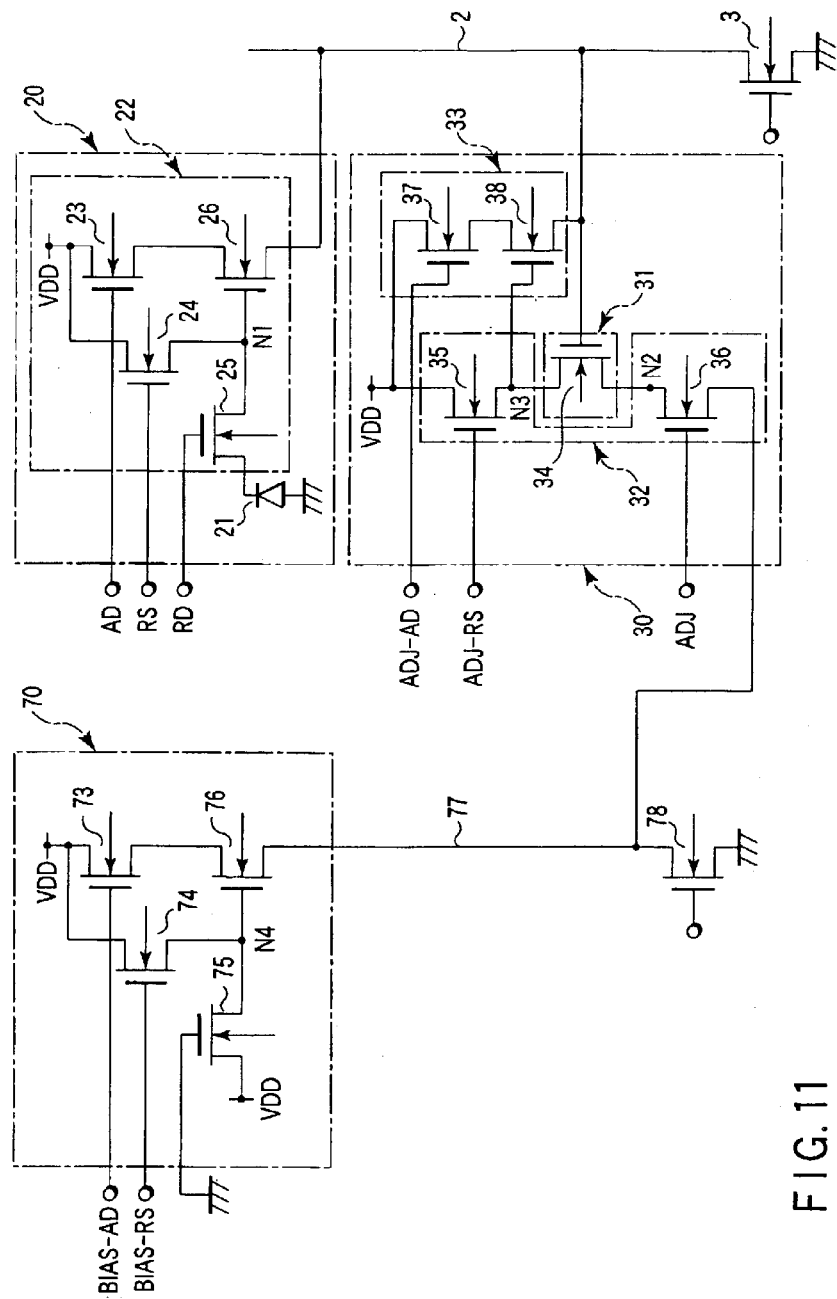
FIG. 11 is a circuit diagram of a part of a solid state image sensor according to a modification of the third embodiment of the invention.

FIG. 11 is a circuit diagram of a unit cell, an adjustment circuit and a bias circuit of a solid state image sensor according to a modification of the third embodiment of the invention. In this modification, like the modification of the second embodiment, the load transistor 3 and the bias load transistor 78 are independently controlled. By controlling the gate voltage of the bias load transistor 78, the voltage applied to the bias voltage output wiring 77 can be controlled. Thereby, the voltage of node N2 in the adjustment circuit 30 can be freely controlled, and the potential decrease in the vertical signal line 2 can be adjusted more effectively.

A solid state image sensor according to a fourth embodiment of the present invention will now be described with reference to FIG. 12. The solid state image sensor of the fourth embodiment differs from that of the first embodiment in that an amplifier circuit 80 is added and the structure of the adjustment circuit 30 is altered. FIG. 12 is a circuit diagram showing a unit cell, an adjustment circuit and an amplifier circuit in the solid state image sensor. The structure of the unit cell is the same as that of each of the first and second embodiments, so a description thereof is omitted.

The adjustment circuit 30 includes a detection section 31, a voltage substitute section 32, a voltage output section 33 and a switching transistor 39. The detection section 31 includes a determination transistor 34. The gate of the determination transistor 34 is connected to the drain of the switching transistor 39. A connection node between the gate of the determination transistor 34 and the drain of the switching transistor 39 is referred to as node N5. The switching transistor 39 has the drain, a source connected to a ground potential, and a gate supplied with a switching signal SW4. The voltage substitute section 32 includes an adjustment reset transistor 35 and an adjustment detection transistor 36. The adjustment reset transistor 35 has a gate supplied with the adjustment reset signal ADJ-RS, a drain connected to a power supply potential VDD, and a source. The adjustment detection transistor 36 has a gate supplied with the adjustment instruction signal ADJ, a drain connected to the source of the determination transistor 34, and a source connected to a ground potential. A node N2 is a connection node between the source of determination transistor 34 and the drain of adjustment detection transistor 36. A node N3 is a connection node between the drain of determination transistor 34 and the source of adjustment reset transistor 35. The voltage output section 33 has an adjustment address transistor 37 and an adjustment output transistor 38. The adjustment address transistor 37 has a gate supplied with the adjustment address signal ADJ-AD, a drain connected to the power supply potential VDD, and a source. The adjustment output transistor 38 has a gate connected to the node N3, a drain connected to the source of adjustment address transistor 37, and a source connected to the vertical signal line 2.

The amplifier circuit 80 has switching transistors 81 and 85 to 88, inverter amplifiers 83 and 84, and a capacitor 82. The switching transistor 81 has a gate supplied with a switching signal SW1, a drain connected to the vertical signal line 2, and a source. The inverter amplifier 83 has an input node connected to the source of the switching transistor 81 via the capacitor 82, and an output node. The inverter amplifier 84 has an input node connected to the output node of the inverter amplifier 83, and an output node. The switching transistor 85 is a p-channel MOS transistor, and the switching transistor 86 is an n-channel MOS transistor, and these transistors form a CMOS switch. Specifically, the source of the switching transistor 85 and the drain of the switching transistor 86 are commonly connected to the output node of the inverter amplifier 84. The drain of the switching transistor 85 and the source of the switching transistor 86 are commonly connected to the node N5 in the adjustment circuit 30. The gates of the switching transistors 85 and 86 are supplied with switching signals SW5 and SW4, respectively. The switching transistor 87 has a gate supplied with a switching signal SW2, a drain connected to the source of the switching transistor 81, and a source connected to a ground potential. The switching transistor 88 has a gate supplied with a switching signal SW3, one of a source and a drain connected to the input node of the inverter amplifier 83, and the other of the source and drain connected to the output node of the inverter amplifier 83.

Figure 13:
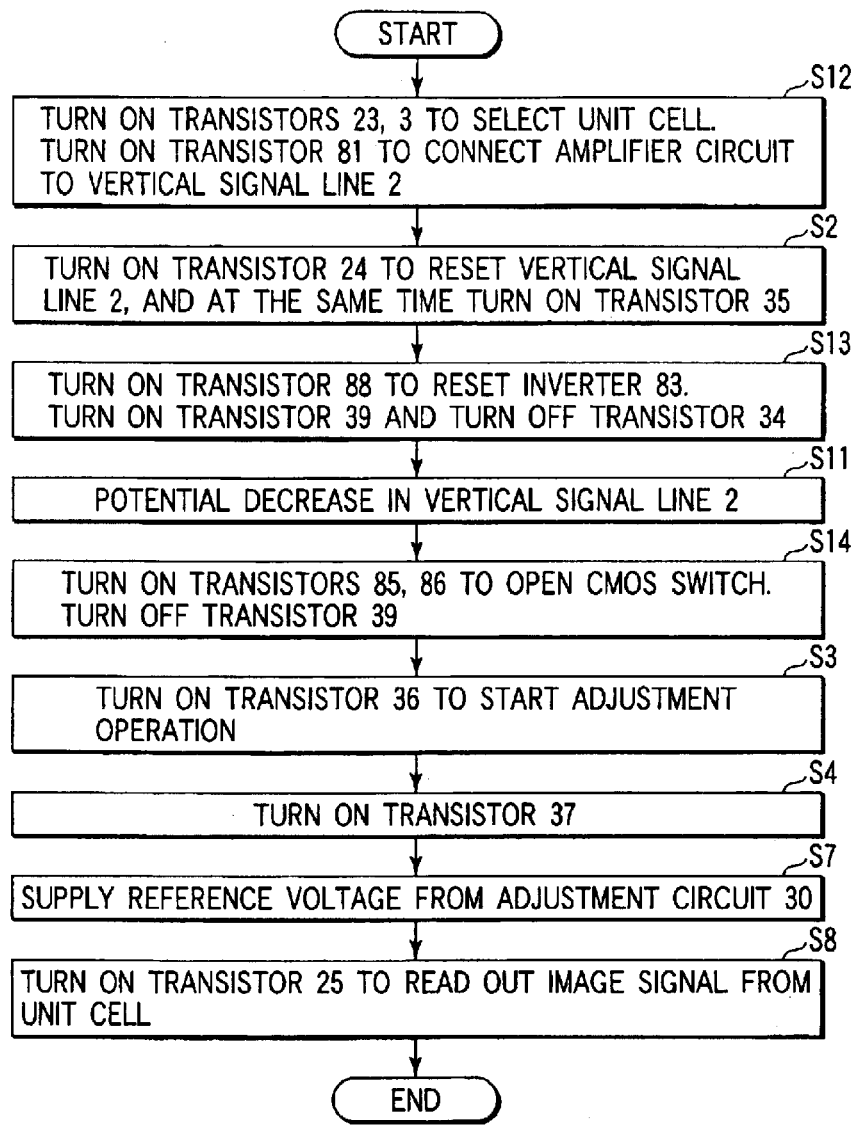
FIG. 13 is a flow chart illustrating the operation of the solid state image sensor according to the fourth embodiment of the invention.
Figure 14:
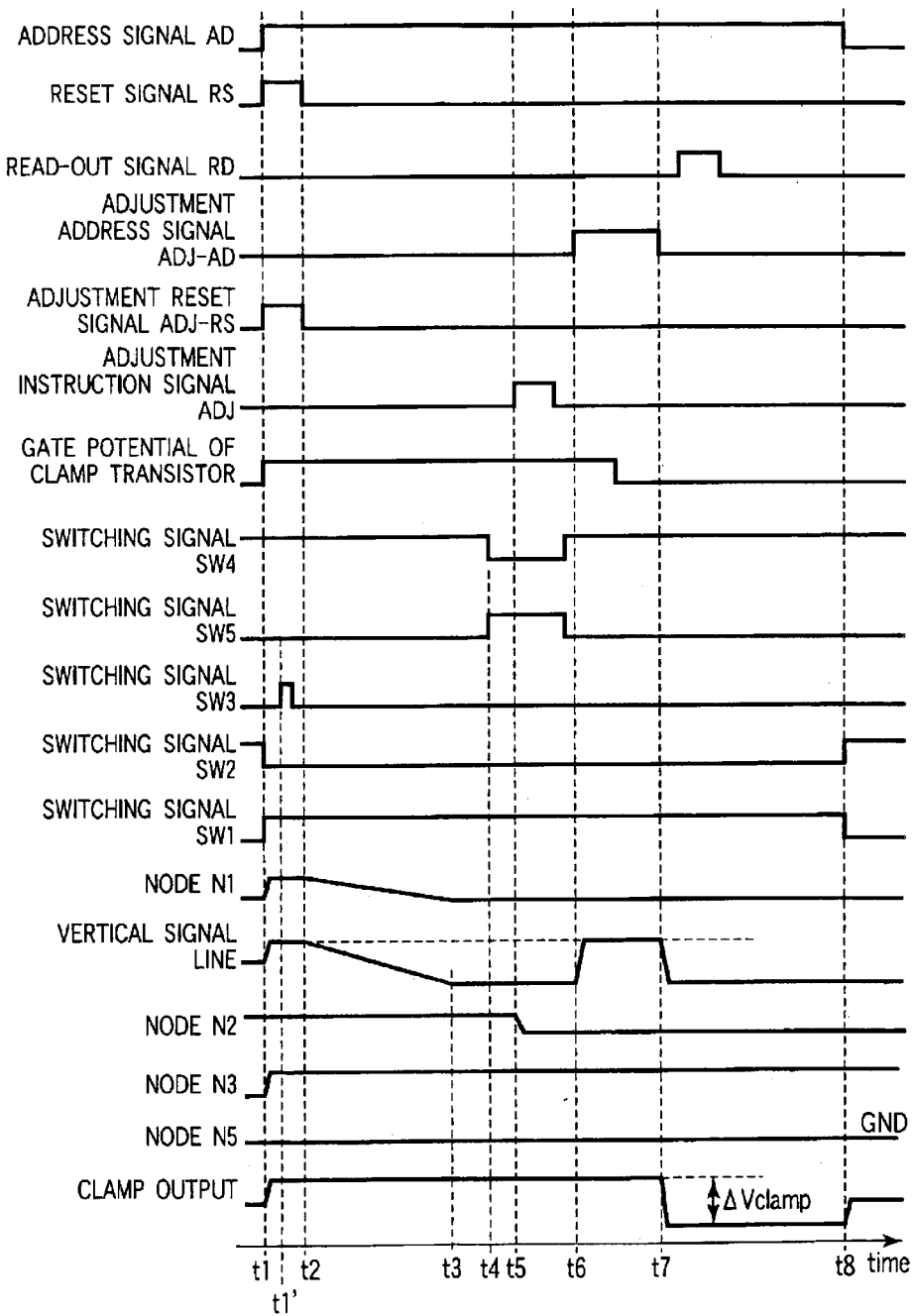
FIG. 14 is a timing chart of various signals at the time when the solid state image sensor according to the fourth embodiment of the invention is operated.

The operation of the solid state image sensor with the above structure will now be described with reference to FIGS. 13 and 14. FIG. 13 is a flow chart illustrating the operation of the solid state image sensor, and FIG. 14 is a timing chart showing potential variations of various signals and nodes. Assume that very intense light has been incident on the solid state image sensor.

In step S12, like the first embodiment, any one of the unit cells is selected (time t1 in FIG. 14). The switching signal SW1 is asserted to turn on the switching transistor 81. Thereby, the amplifier circuit 80 is electrically connected to the vertical signal line 2. During the time period when the switching transistor 81 is turned off and the amplifier circuit 80 is electrically disconnected from the vertical signal line 2, the switching transistor 87 is turned on to set the connection node between the switching transistor 81 and capacitor 82 at the ground potential, thereby to prevent malfunction of the inverter amplifiers 83 and 84.

In step S2, a reset operation is performed to set the vertical signal line 2 at a predetermined reference potential (time t2 in FIG. 14). In the reset operation, the reset signal RS is asserted to turn on the reset transistor 24 in the unit cell 20. Thereby, the output transistor 26 is turned on, and the vertical signal line 2 is set at the predetermined reference potential. At the same time, the adjustment reset signal ADJ-RS is asserted to turn on the adjustment reset transistor 35 in the adjustment circuit 30.

Figure 15:
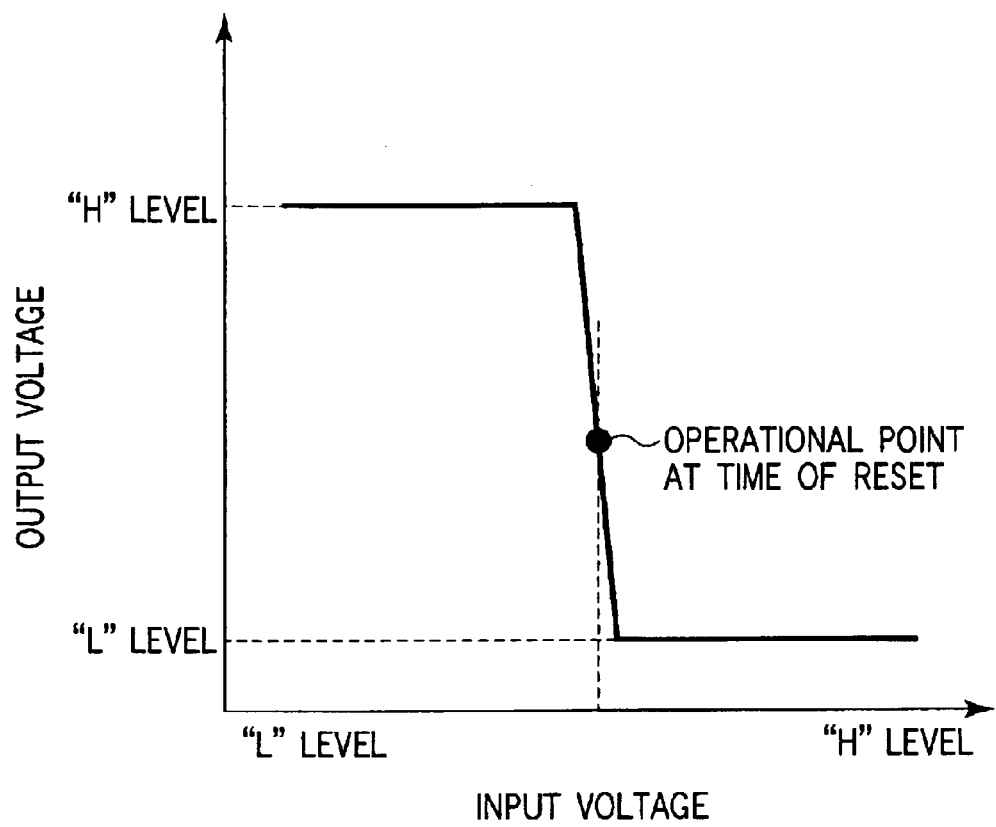
FIG. 15 is a characteristic diagram showing input/output characteristics of an inverter amplifier.

In the next step S13, the inverter amplifier 83 in the amplifier circuit 80 is reset (time t1' in FIG. 14). To be more specific, the switching signal SW3 is asserted to turn on the switching transistor 88. Thereby, the potentials of the input node and output node in the inverter amplifier 83 are equalized, as illustrated in FIG. 15. FIG. 15 is a graph showing input/output characteristics of the inverter amplifier. If the potentials of the input node and output node of the inverter amplifier 83 are equalized, the operational point of inverter amplifier 83 is set at an intermediate point between "L" level and "H" level. Assuming that the switching transistor 81 side electrode of capacitor 82 is a first electrode and the inverter amplifier 83 side electrode of capacitor 82 is a second electrode, the potential of the first electrode is the reference potential applied from the unit cell 20, and the potential of the second electrode is the intermediate potential of the inverter amplifier 83. If the potential of the signal line 2 varies only slightly from the reference potential, the potential of the second electrode will vary due to the coupling. Accordingly, using the reference potential as the threshold, the inverter amplifier 83 outputs "H" level if the signal line potential decreases. If the signal line potential increases, it outputs "L" level. In addition, the switching signal SW4 is asserted to turn on the switching transistor 39 in the adjustment circuit 30 and the node N5 is set at the ground potential. Accordingly, the determination transistor 34 is in the off-state.

Assume that, thereafter, the potential of node N1 in the unit cell 20 has decreased due to light incidence and the potential of the vertical signal line 2 has lowered (step S1; time t2–t3 in FIG. 14).

As mentioned above, the inverter amplifier 83 is in the reset state. Thus, if the potential of the vertical signal line 2 has decreased only slightly, the potential corresponding to the amount of the decrease is amplified and inverted and an "H" level signal is output from the output node. The "H" level signal is further amplified and inverted in the inverter amplifier 84, and an "L" level signal is output.

Subsequently, in step S14, the switching transistors 85 and 86 are turned on, and the CMOS switch is opened (time t4 in FIG. 14). In this case, the switching transistor 39 is in the off-state since the switching signal SW4 also input to the gate of the switching transistor 39. The "L" level output of the inverter amplifier 83 is delivered to the node N5 via the CMOS switch. Accordingly, the node N5 remains substantially at the ground potential and the determination transistor 34 also remains in the off-state.

In the next step S3, an adjustment operation is performed prior to read-out of the image signal from the unit cell 20. Specifically, the adjustment instruction signal ADJ is asserted to turn on the adjustment detection transistor 36 (time t5 in FIG. 14).

In step S4, the adjustment address signal ADJ-AD is asserted to turn on the adjustment address transistor 37 (time t6 in FIG. 14). As a result, the vertical signal line 2 is re-supplied with the predetermined reference potential through a path extending from the power supply potential VDD to the vertical signal line 2 via the transistors 37 and 38 in the adjustment circuit 30 (time t7 in FIG. 14).

Thereafter, like the first embodiment, the image signal is read out from the unit cell 20 to the vertical signal line 2 in step S3.

The solid state image sensor according to the fourth embodiment is provided with the amplifier circuit 80. The potential of the vertical signal line 2 is amplified, and the amplified potential is applied to the gate of the determination transistor 34. Thus, even if a potential decrease in the vertical signal line 2 is small, the vertical signal line 2 is supplied with the reference potential from the adjustment circuit 30. This advantageous effect will now be explained in comparison with the first to third embodiments. In the first to third embodiments, the potential of the vertical signal line 2 is directly input to the gate of the determination transistor 34 in order to monitor the potential decrease in the vertical signal line 2. According to this technique, in some cases, the determination transistor 34 is not turned off until the potential of the vertical signal line 2 has greatly decreased, and the adjustment operation cannot be started. As a result, the output transistor 26 in the unit cell 20 may take a state between the on-state and the off-state, resulting in instability in the potential of the vertical signal line 2. By contrast, according to the present embodiment, the amplifier circuit 80 amplifies a variation of the potential of the vertical signal line 2. Thus, even if the potential decrease in the vertical signal line 2 is small, the adjustment circuit 30 can instantaneously deliver the reference potential to the vertical signal line 2. Accordingly, in the reset operation, either the output transistor 26 in the unit cell 20 or the adjustment output transistor 38 in the adjustment circuit 30 is completely in the on-state. Therefore, the potential of the vertical signal line 2 can always be stabilized.

In addition, the switching transistor 39 is in the on-state immediately before the adjustment instruction signal ADJ is asserted. Thus, the node N5 is substantially at the ground potential, and the determination transistor 34 is in the off-state. Hence, the node N3 never has the ground potential, and the adjustment circuit 30 can exactly output the reference voltage.

Furthermore, when the potential of the vertical signal line 2 becomes higher than the reference potential, the node N5 takes "H" level and the determination transistor 34 is turned on. To cope with this, the adjustment instruction signal ADJ should be asserted to set the node N3 at the ground potential and to turn off the adjustment output transistor 38.

As has been described above, according to the solid state image sensor of this embodiment, the decrease in magnitude of the image signal can be suppressed, and the operational reliability can be enhanced.

Figure 16:
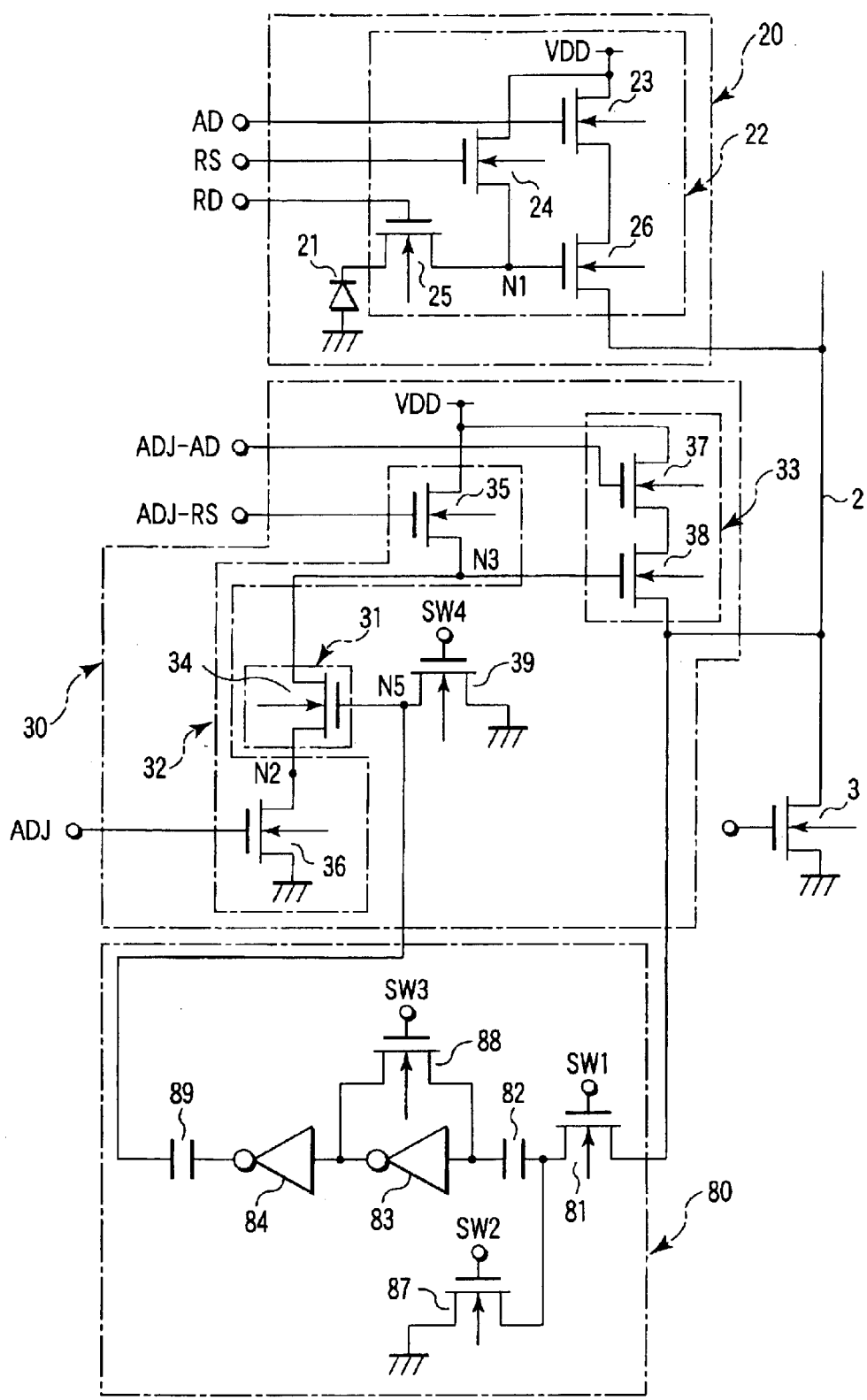
FIG. 16 is a circuit diagram of a part of a solid state image sensor according to a modification of the fourth embodiment of the invention.

FIG. 16 is a circuit diagram of a unit cell, an adjustment circuit and an amplifier circuit of a solid state image sensor according to a modification of the fourth embodiment. In this modification, the CMOS switch comprising the switching transistors 85 and 86 is replaced with a capacitor 89. The structure of this modification is the same as the structure shown in FIG. 12, except for the elimination of the switching signal SW5. Thus, a description of this modification is omitted. In this modification, too, the same advantage as the fourth embodiment is obtained.

Figure 17:
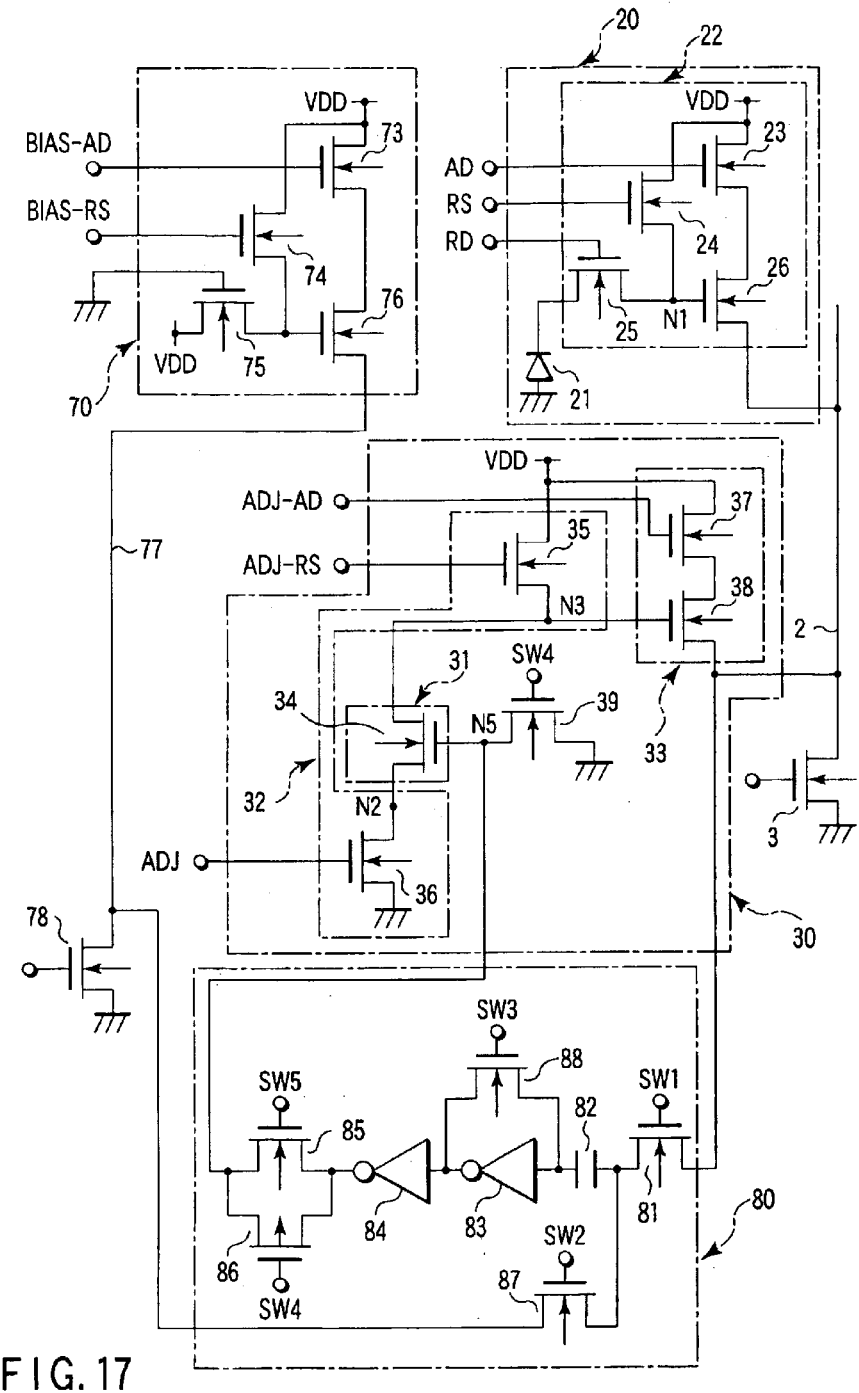
FIG. 17 is a circuit diagram of a part of a solid state image sensor according to a fifth embodiment of the invention.

A solid state image sensor according to a fifth embodiment of the invention will now be described with reference to FIG. 17. FIG. 17 is a circuit diagram of parts of the solid state image sensor.

As is shown in FIG. 17, the solid state image sensor of this embodiment is formed by adding the bias circuit 70, as described in connection with the second embodiment, to the solid state image sensor of the fourth embodiment. The bias voltage output wiring 77 of the bias circuit 70 is connected to the source of the switching transistor 87 of the amplifier circuit 80.

Figure 18:
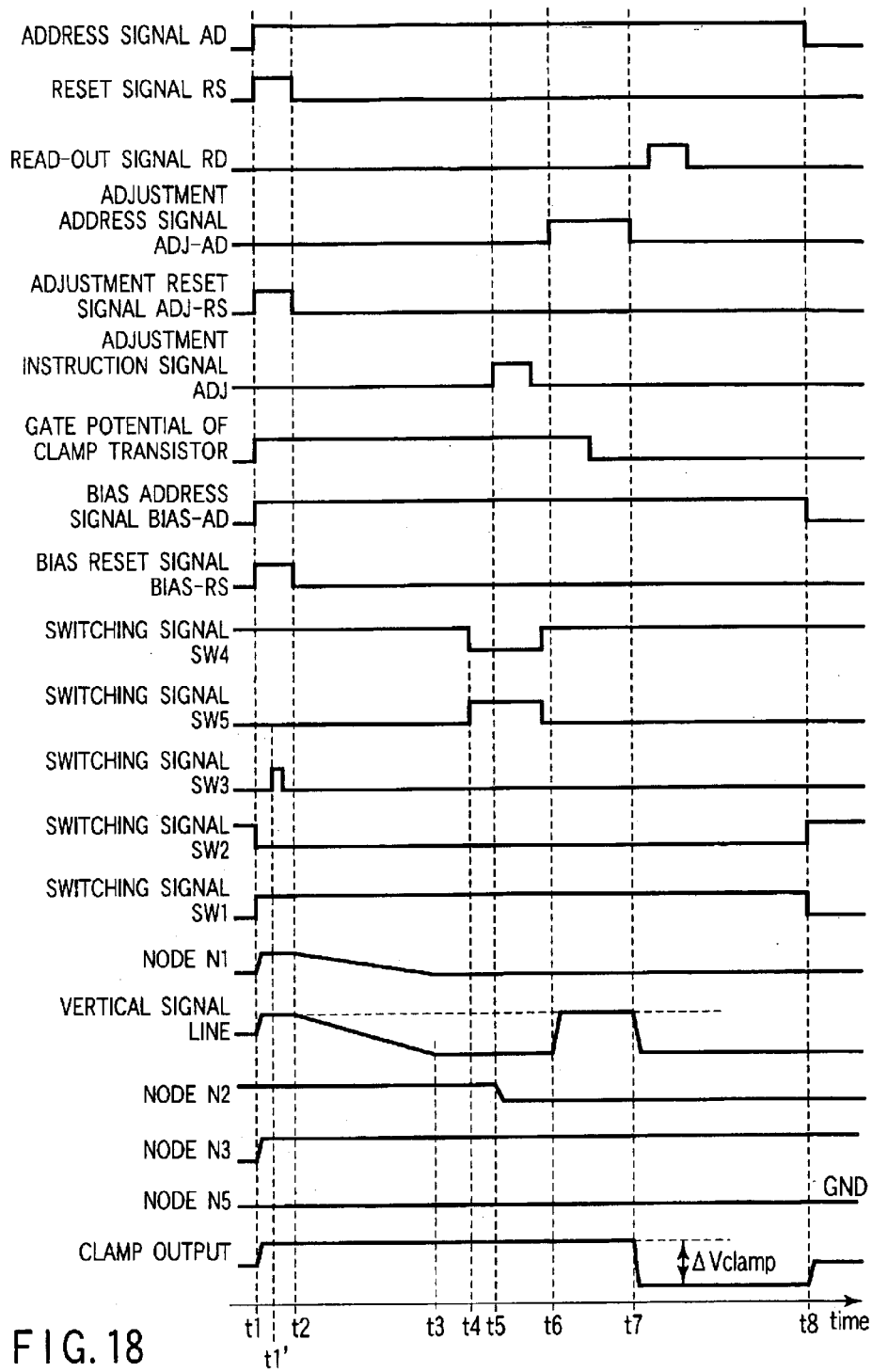
FIG. 18 is a timing chart of various signals at the time when the solid state image sensor according to the fifth embodiment of the invention is operated.

The operation of the solid state image sensor according to the fifth embodiment will now be described with reference to FIG. 18. FIG. 18 is a timing chart of various signals. The operation of this solid state image sensor is basically the same as that of the fourth embodiment. Only the points different from the fourth embodiment will be described.

At time t1, when the unit cell 20 is selected and the vertical signal line 2 is reset, the switching signal SW1 is negated to turn off the switching transistor 81. Thereby, the amplifier circuit 80 is electrically disconnected from the vertical signal line 2. In addition, the switching signal SW2 is asserted to turn on the switching transistor 87. Thereby, the input node potential of the inverter amplifier 83 is set at the potential of the bias voltage output wiring 77. Further, the inverter amplifier 83 is reset during the time period when the switching transistor 81 is turned off and the switching transistor 87 is turned on.

Then, after the switching transistor 81 is turned on and the switching transistor 87 is turned off, the same operation as in the fourth embodiment will be performed.

In addition to the advantage of the fourth embodiment, the solid state image sensor of the fifth embodiment permits free setting of the threshold at which the adjustment circuit 30 delivers the reference voltage to the vertical signal line 2. Specifically, when the inverter amplifier 83 is reset, the voltage generated by the bias circuit 70 is applied to the first electrode of capacitor 82. At this time, the second electrode of capacitor 82 is set at an intermediate potential of the inverter amplifier 83. Following the completion of the reset operation, the switching transistor 87 is turned off and the switching transistor 81 is turned on. Thus, the amplifier circuit 80 is electrically connected to the vertical signal line 2. If the signal line potential is equal to the potential generated by the bias circuit 77, the inverter amplifier 88 remains at an intermediate level, and not "H" level or "L" level. On the other hand, if the signal line potential is different from the potential generated by the bias circuit 77, the potential of the second electrode of the capacitor 82 varies due to the coupling. Even if the amount of the variation is small, the inverter amplifier 83, which is in the reset state, produces an "H" level signal or an "L" level signal. In other words, whether the reference potential is to be applied to the signal line 2 from the unit cell 20 or from the adjustment circuit 30 can be determined on the basis of the potential variation in the signal line with reference to the potential generated by the bias circuit 77. As a result, the potential decrease in the vertical signal line 2 can be adjusted more effectively. Needless to say, the CMOS switch in the amplifier circuit 80 may be replaced with a capacitor. Moreover, as shown in FIG. 5, the gates of the transistors 3 and 78 may be controlled by the same signal.

Figure 19:
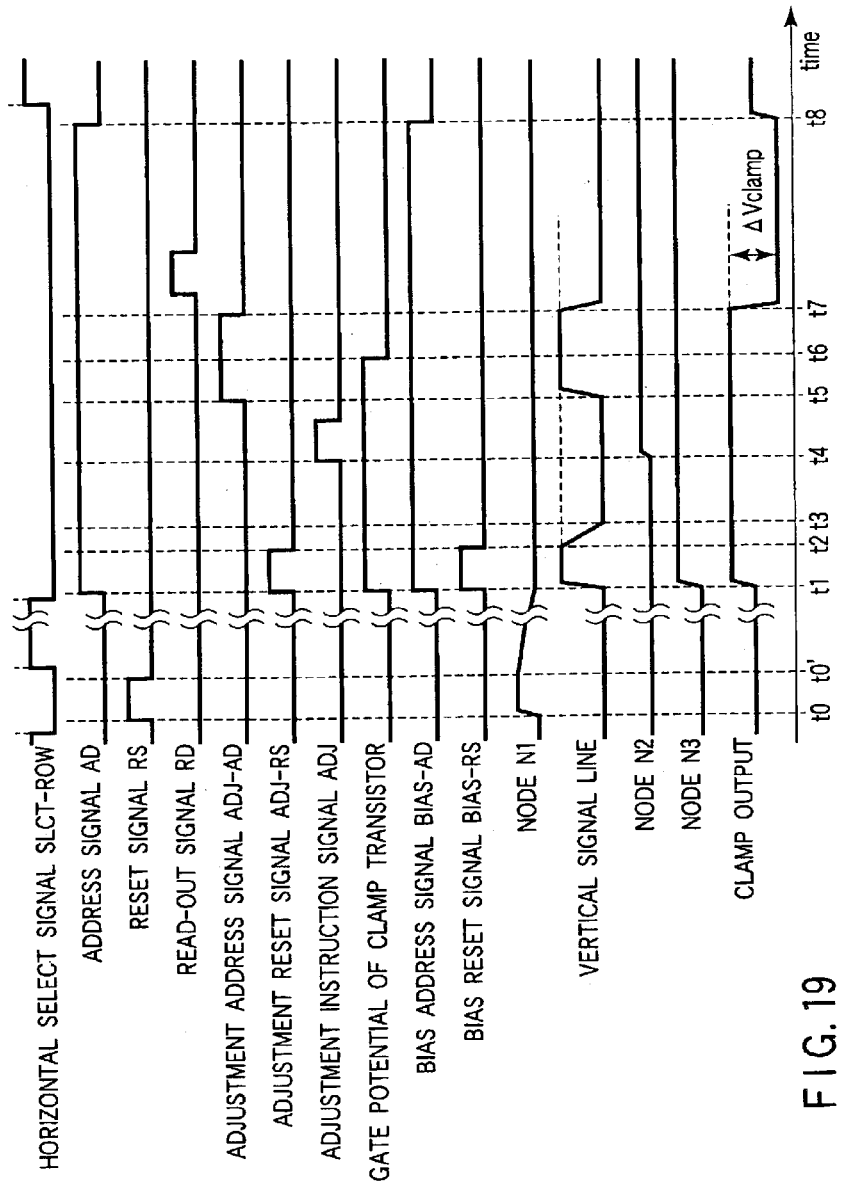
FIG. 19 is a timing chart of various signals at the time when a solid state image sensor according to a sixth embodiment of the invention is operated.

A solid state image sensor according to a sixth embodiment of the invention will now be described with reference to FIG. 19. FIG. 19 is a timing chart of various signals. In the sixth embodiment, attention is paid to the resetting operation in the solid state image sensors according to the first to fifth embodiments. The points different from the reset operation in the third embodiment will now be described, referring to the solid state image sensor of the third embodiment by way of example. Assume that very intense light has been incident on the solid state image sensor.

In the solid state image sensor, as shown in FIG. 1, the horizontal selection is effected by the horizontal select circuit 60-2. The horizontal select circuit 60-2 selects the read-out transistor 4 by a horizontal select signal SLCT-ROW, and reads out the image signal from the unit cell to the output node OUT. The horizontal select signal SLCT-ROW is negated when the vertical signal line 2 is reset. This time period is referred to as "horizontal blanking period". The horizontal select signal SLCT-ROW is asserted after the image signal is read out of the unit cell. This time period is referred to as "horizontal effective period".

In the solid state image sensor of the sixth embodiment, as shown in FIG. 19, in the horizontal blanking period (time t0–t0') prior to time t1 at which the adjustment operation begins, the reset signal RS is asserted to turn on the reset transistor 24. In the next blanking period, the address signal AD is asserted to supply the reference voltage to the vertical signal line 2. That is, the node N1 is held at floating state in the horizontal blanking period.

With the driving method for the solid state image sensor according to the sixth embodiment, the potential of the vertical signal line 2 can be adjusted more exactly. The reason is that the output transistor 26 is turned on after one cycle of the horizontal effective period has passed since the reset signal was asserted. More specifically, charge is accumulated at node N1 over a long time period of one cycle of the horizontal effective period. Thus, the potential of node N1 can fully be decreased when intense light has been incident on the solid state image sensor. Hence, the determination transistor 34 can exactly be turned off. Therefore, when the adjustment detection transistor 34 has been turned on, the voltage of the bias voltage output wiring 77 is not applied to the node N3. The reliability of the adjustment operation can be enhanced.

Needless to say, the reset signal may be asserted several cycles, and not one cycle, before the output transistor 26 is turned on. Further, there is no need to synchronize the assertion of the reset signal with the horizontal select signal SLCT-ROW.

As has been described above, the embodiments of the present invention can provide a solid state image sensor and a driving method for the solid state image sensor, which can suppress the decrease in magnitude of the image signal when intense light has been incident on the solid state image sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid state image sensor comprising:
an imaging circuit having a plurality of unit cells arranged in an array, each unit cell including a photo-detection section which photoelectrically converts incident light and outputs a signal charge corresponding to the incident light, and a first reference potential generating section which generates a first reference potential;
a selection circuit which selects the unit cell;
a signal line which is supplied with a signal potential corresponding to the signal charge from the unit cell selected by the selection circuit in a read-out operation, and supplied with the first reference potential in a reset operation; and
an adjustment circuit which operates in response to an adjustment instruction signal which is asserted in an adjustment operation following the reset operation, and applies a second reference potential to the signal line in accordance with a potential of the signal line, the adjusting circuit including:
a detection section which connects a first node and a ground potential node when the potential of the signal line is higher than a predetermined value, and disconnects the first node and the ground potential node when the potential of the signal line is lower than the predetermined value;
a voltage substitute section which connects the first node and a second node supplied with a control potential in the reset operation, during a time period when the adjustment instruction signal is asserted, and disconnects the first node and the second node during a time period when the adjustment instruction signal is negated; and
a second reference potential generating circuit which operates in response to a potential of the second node, is set in an inoperative state when the potential of the second node is equal to the ground potential, and is set in an operative state and applies the second reference potential to the signal line when the potential of the second node is equal to the control potential.

2. The solid state image sensor according to claim 1, wherein the voltage substitute section connects, in the reset operation, the second node and a control potential node which supplies the control potential, and disconnects the second node and the control potential node in the adjustment operation.

3. The solid state image sensor according to claim 2, wherein the detection section includes a first MOS transistor having a gate connected to the signal line, one end of a current path connected to the ground potential node, and the other end of the current path connected to the first node,
the voltage substitute section includes a second MOS transistor having a gate supplied with the adjustment instruction signal, one end of a current path connected to the first node, and the other end of the current path connected to the second node, and a third MOS transistor having a gate supplied with an adjustment reset signal which is asserted in the reset operation, one end of a current path connected to the second node, and the other end of the current path connected to the control potential node, and
the second reference potential generating circuit includes a fourth MOS transistor having a gate connected to the second node, one end of a current path connected to a third node, and the other end of the current path connected to the signal line, and a fifth MOS transistor having a gate supplied with a control signal which is asserted when the second reference potential is to be generated, one end of a current path connected to a power supply potential, and the other end of the current path connected to the third node.

4. A solid state image sensor comprising:
an imaging circuit having a plurality of unit cells arranged in an array, each unit cell including a photo-detection section which photoelectrically converts incident light and outputs a signal charge corresponding to the incident light, and a first reference potential generating section which generates a first reference potential;
a selection circuit which selects the unit cell;
a signal line which is supplied with a signal potential corresponding to the signal charge from the unit cell selected by the selection circuit in a read-out operation, and supplied with the first reference potential in a reset operation;
an adjustment circuit which operates in response to an adjustment instruction signal which is asserted in an adjustment operation following the reset operation, and applies a second reference potential to the signal line in the adjustment operation if the signal potential of the signal line becomes lower than the first reference potential; and
a third reference potential generating circuit which generates a third reference potential and supplies the third reference potential as an operational reference potential to the adjustment circuit.

5. The solid state image sensor according to claim 4, wherein the adjustment circuit includes:
a detection section which connects a first node and a third reference potential node which supplies the third reference potential, when the potential of the signal line is higher than a predetermined value, and disconnects the first node and the third reference potential node when the potential of the signal line is lower than the predetermined value;
a voltage substitute section which connects the first node and a second node supplied with a control potential in the reset operation, during a time period when the adjustment instruction signal is asserted, and disconnects the first node and the second node during a time period when the adjustment instruction signal is negated; and
a second reference potential generating circuit which operates in response to a potential of the second node, is set in an inoperative state when the potential of the second node is equal to the third reference potential, and is set in an operative state and applies the second reference potential to the signal line when the potential of the second node is equal to the control potential.

6. The solid state image sensor according to claim 5, wherein the voltage substitute section connects, in the reset operation, the second node and a control potential node which supplies the control potential, and disconnects the second node and the control potential node in the adjustment operation.

7. The solid state image sensor according to claim 4, wherein the adjustment circuit includes:
a detection section which connects a first node and a second node supplied with a control potential in the reset operation, when the potential of the signal line is higher than a predetermined value, and disconnects the first node and the second node when the potential of the signal line is lower than the predetermined value;
a voltage substitute section which connects the first node and a third reference potential node which supplies the third reference potential, during a time period when the adjustment instruction signal is asserted, and disconnects the first node and the third reference potential node during a time period when the adjustment instruction signal is negated; and
a second reference potential generating circuit which operates in response to a potential of the second node, is set in an operative state and applies the second reference potential to the signal line when the potential of the second node is equal to the control potential, and is set in an inoperative state when the potential of the second node is equal to the third reference potential.

8. The solid state image sensor according to claim 7, wherein the voltage substitute section connects, in the reset operation, the second node and a control potential node which supplies the control potential, and disconnects the first node and the control potential node in the adjustment operation.

9. The solid state image sensor according to claim 4, wherein the third reference potential generating circuit has substantially the same structure as the first reference potential generating circuit.

10. The solid state image sensor according to claim 4, further comprising a bias control circuit which controls the third reference potential independently of the first reference potential.

11. A solid state image sensor comprising:
an imaging circuit having a plurality of unit cells arranged in an array, each unit cell including a photo-detection section which photoelectrically converts incident light and outputs a signal charge corresponding to the incident light, and a first reference potential generating section which generates a first reference potential;
a selection circuit which selects the unit cell;
a signal line which is supplied with a signal potential corresponding to the signal charge from the unit cell selected by the selection circuit in a read-out operation, and supplied with the first reference potential in a reset operation;
an amplifier circuit which amplifies a potential of the signal line; and
an adjustment circuit which operates in response to an adjustment instruction signal which is asserted in an adjustment operation following the reset operation, and applies a second reference potential to the signal line in accordance with the potential of the signal line amplified by the amplifier circuit.

12. The solid state image sensor according to claim 11, wherein the adjustment circuit includes:
a detection section which connects/disconnects a first node and a second node supplied with a control potential in the reset operation;
a voltage substitute section which connects the first node and a ground potential node, during a time period when the adjustment instruction signal is asserted, and disconnects the first node and the ground potential node during a time period when the adjustment instruction signal is negated; and
a second reference potential generating circuit which operates in response to a potential of the second node, is set in an operative state and applies the second reference potential to the signal line when the potential of the second node is equal to the control potential, and is set in an inoperative state when the potential of the second node is a non-control potential, and
the amplifier circuit includes:
a capacitor having one electrode connected to the signal line and the other electrode connected to a third node;
a first inverter having an input node connected to the third node and an output node, and inverting and amplifying an input signal; and
a second inverter having an input node connected to the output node of the first inverter and an output node, and inverting and amplifying an output from the first inverter, the detection section connecting the first node and second node when an output of the second inverter is at "H" level, and disconnecting the first node and the second node when the output of the second inverter is at "L" level.

13. The solid state image sensor according to claim 12, wherein the amplifier circuit further comprises a short-circuit switch which short-circuits the input and output nodes of the first inverter, the short-circuit switch being turned on at a time during the reset operation, thereby setting an operational threshold of the first inverter at the first reference potential.

14. The solid state image sensor according to claim 12, wherein the voltage substitute section connects, in the reset operation, the second node and a control potential node which supplies the control potential, and disconnects the second node and the control potential node in the adjustment operation.

15. The solid state image sensor according to claim 12, further comprising a third reference potential generating circuit which generates a third reference potential and controls the operation of the first inverter by the third reference potential.

16. The solid state image sensor according to claim 15, wherein the amplifier circuit further includes:
- a short-circuit switch which short-circuits the input and output nodes of the first inverter;
- a first connection switch which controls connection between the signal line and one electrode of the capacitor; and
- a second connection switch which connects the third node and the third reference potential generating circuit, and the first connection switch is turned off, the second connection switch is turned on and the short-circuit switch is turned on, prior to the adjustment operation, to apply the third reference potential to the third node, and the first inverter performs an inverting/amplifying operation in accordance with an amount of variation in potential of the signal line relative to the third reference potential in the adjustment operation.

17. The solid state image sensor according to claim 15, wherein the third reference potential generating circuit has substantially the same structure as the first reference potential generating circuit.

18. The solid state image sensor according to claim 15, further comprising a bias control circuit which controls the third reference potential independently of the first reference potential.

* * * * *